United States Patent [19]
Carlson

[11] Patent Number: 5,119,929
[45] Date of Patent: Jun. 9, 1992

[54] INTEGRATED BUFFING AND GRINDING SYSTEM

[75] Inventor: Don F. Carlson, Bloomfield Hills, Mich.

[73] Assignee: Acme Manufacturing, Madison Heights, Mich.

[21] Appl. No.: 594,632

[22] Filed: Oct. 9, 1990

Related U.S. Application Data

[60] Continuation-in-part of Ser. No. 355,684, May 23, 1989, which is a division of Ser. No. 269,473, Nov. 9, 1988.

[51] Int. Cl.⁵ .............................................. B65G 47/24
[52] U.S. Cl. ................................ 198/377; 198/803.01
[58] Field of Search ................... 198/345.1, 346.3, 394, 198/375, 376, 377, 378, 379, 802, 465.1, 465.2, 465.3, 803.01, 803.2; 29/33 P

[56] References Cited

U.S. PATENT DOCUMENTS

| | | |
|---|---|---|
| 1,620,120 | 3/1927 | Morshead . |
| 2,259,685 | 10/1941 | Elsloo . |
| 2,598,163 | 5/1952 | Halls .................. 198/377 X |
| 2,964,883 | 12/1960 | Harper . |
| 3,289,234 | 12/1966 | Nelson . |
| 3,407,425 | 10/1968 | Drumm . |
| 3,441,968 | 5/1969 | Kramer . |
| 3,604,045 | 9/1971 | Smith . |
| 3,643,281 | 2/1972 | Schofield . |
| 3,724,140 | 4/1973 | Harper . |
| 3,728,830 | 4/1973 | Macu . |
| 4,133,423 | 1/1979 | Zankl . |
| 4,144,960 | 3/1979 | Scourtes . |
| 4,199,903 | 4/1980 | Fitzpatrick . |
| 4,214,780 | 7/1980 | Grace . |
| 4,217,978 | 8/1980 | Stalker . |
| 4,312,110 | 1/1982 | Averyanov et al. . |
| 4,449,277 | 5/1984 | Hasegawa et al. . |
| 4,473,935 | 10/1984 | Tatsuura et al. . |
| 4,487,309 | 12/1984 | Dorner . |
| 4,589,467 | 5/1986 | Hunter . |
| 4,609,091 | 9/1986 | Dorner . |
| 4,732,256 | 3/1988 | Dorner . |
| 4,777,687 | 10/1988 | Cann et al. . |
| 4,809,422 | 3/1989 | Kitamura . |
| 4,815,190 | 3/1989 | Haba, Jr. et al. . |
| 4,930,258 | 6/1990 | Carlson et al. . |
| 4,946,021 | 8/1990 | Murphy ................ 198/803.01 X |
| 5,023,974 | 6/1991 | Coles ..................... 198/377 X |

FOREIGN PATENT DOCUMENTS

| | | |
|---|---|---|
| 114351 | 7/1982 | Japan . |
| 184651 | 11/1982 | Japan . |
| 201726 | 2/1986 | Japan . |
| 180440 | 7/1988 | Japan . |

Primary Examiner—D. Glenn Dayoan
Attorney, Agent, or Firm—Harness, Dickey & Pierce

[57] ABSTRACT

The present invention is an integrated finishing system for performing finishing operations, including a conveyor for transferring articles from a loading station to a work station and from the work station to an unloading station. The system includes a pallet for supporting an article and adapted to move along the conveyor, a finishing device at the work station, and a shuttle assembly for transferring a predetermined number of the pallets between the finishing device and the conveyor. The pallet includes a structure operatively cooperating with the shuttle assembly for automatically allowing rotation of the articles upon the pallet.

10 Claims, 14 Drawing Sheets

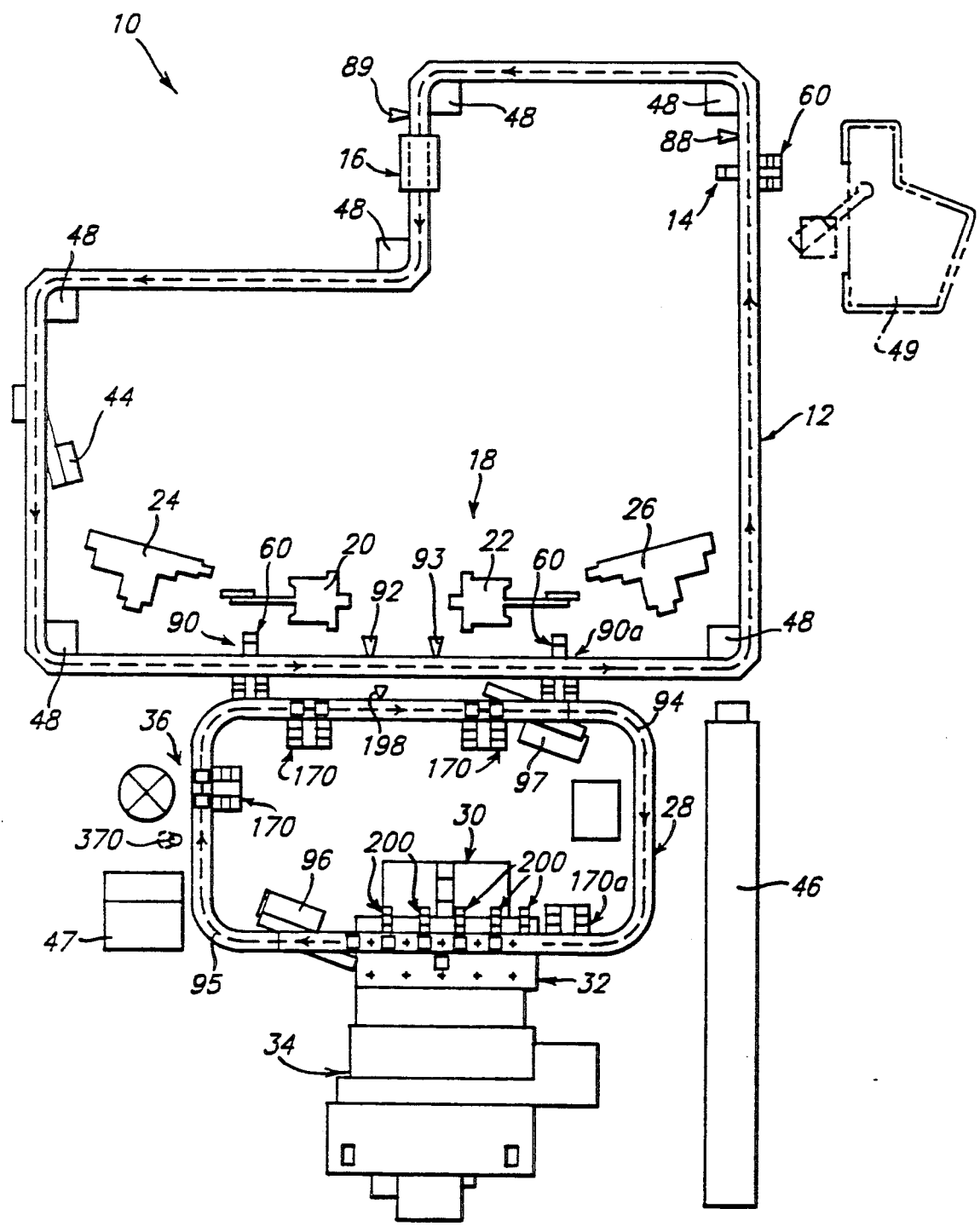

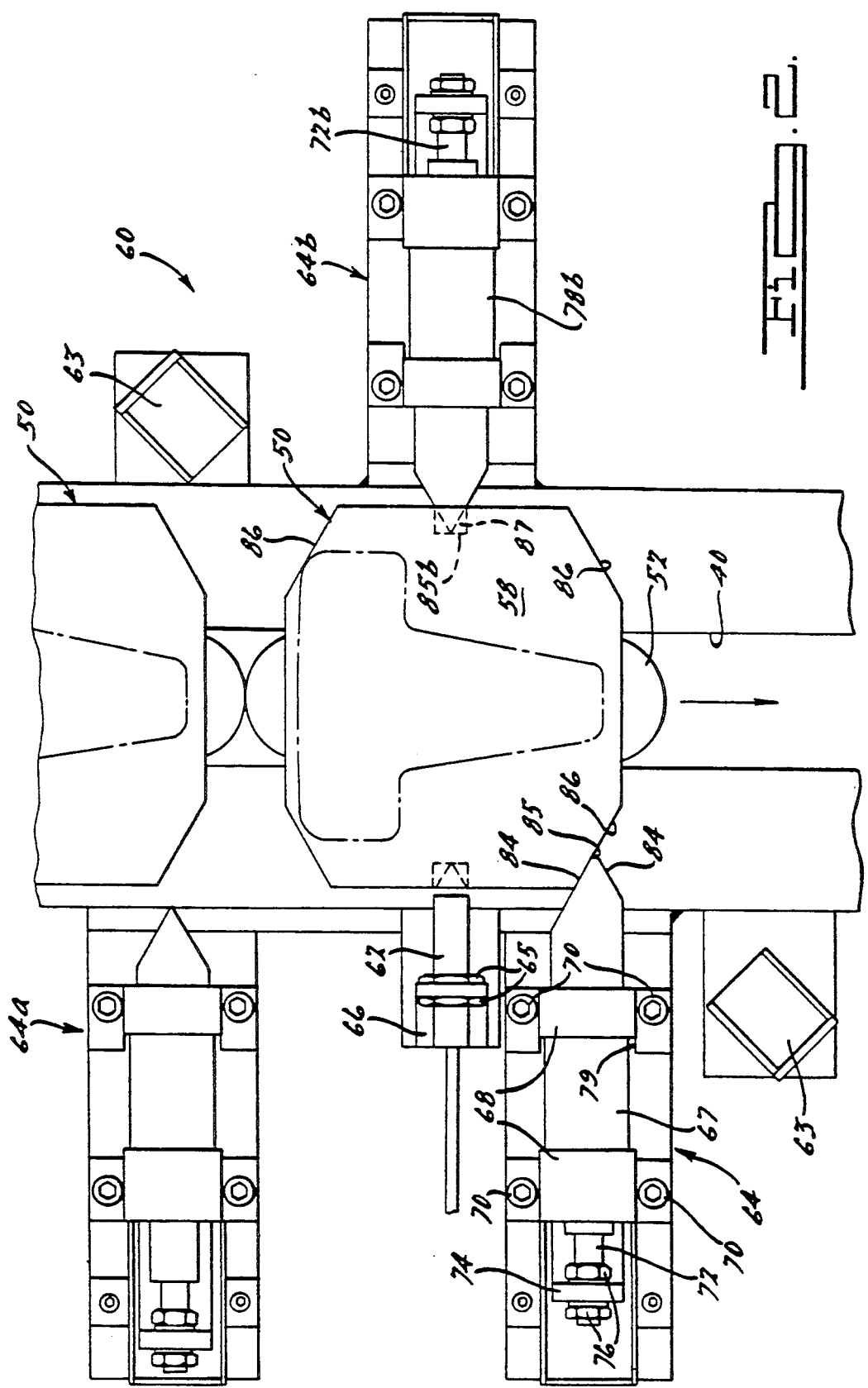

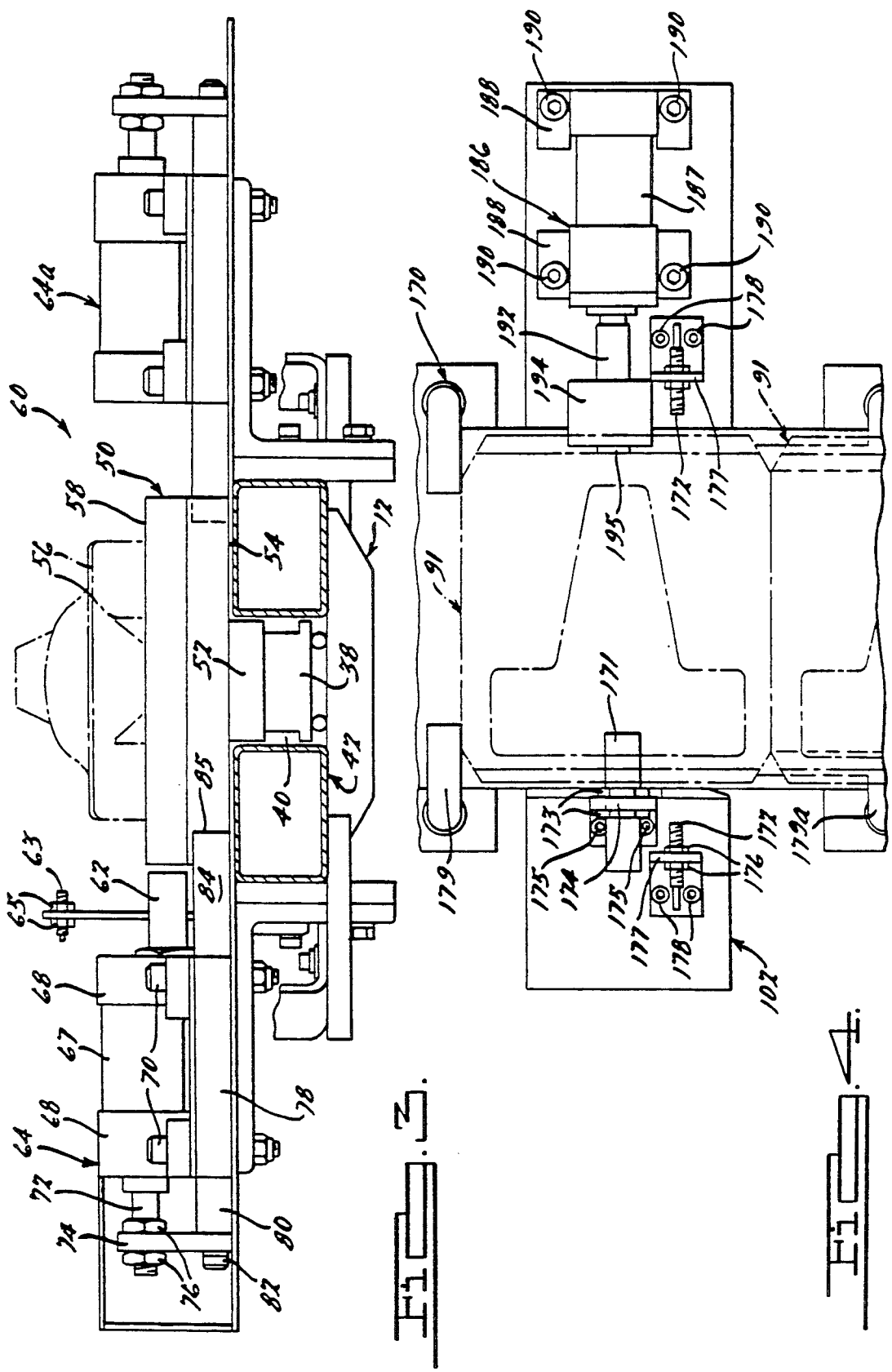

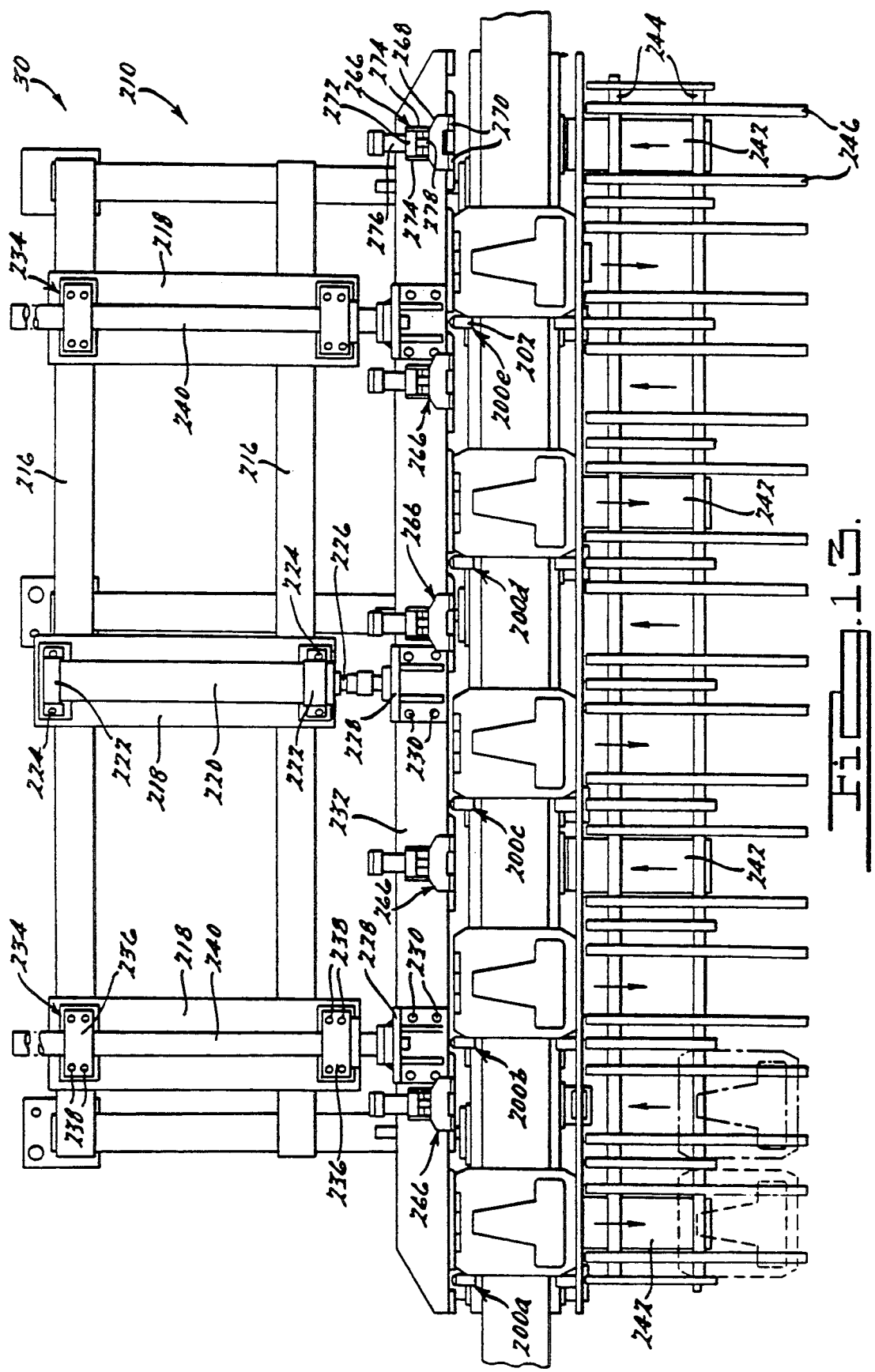

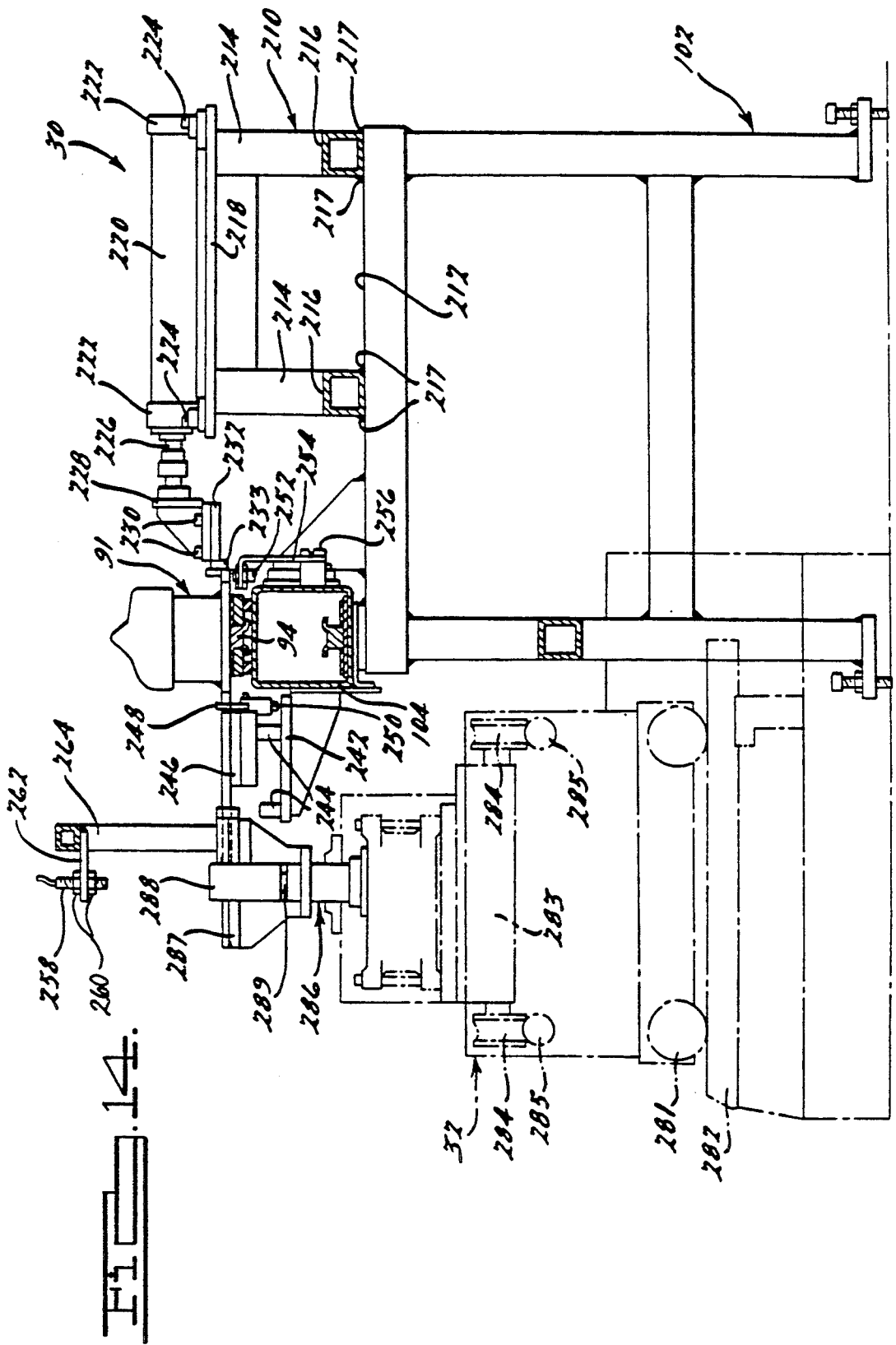

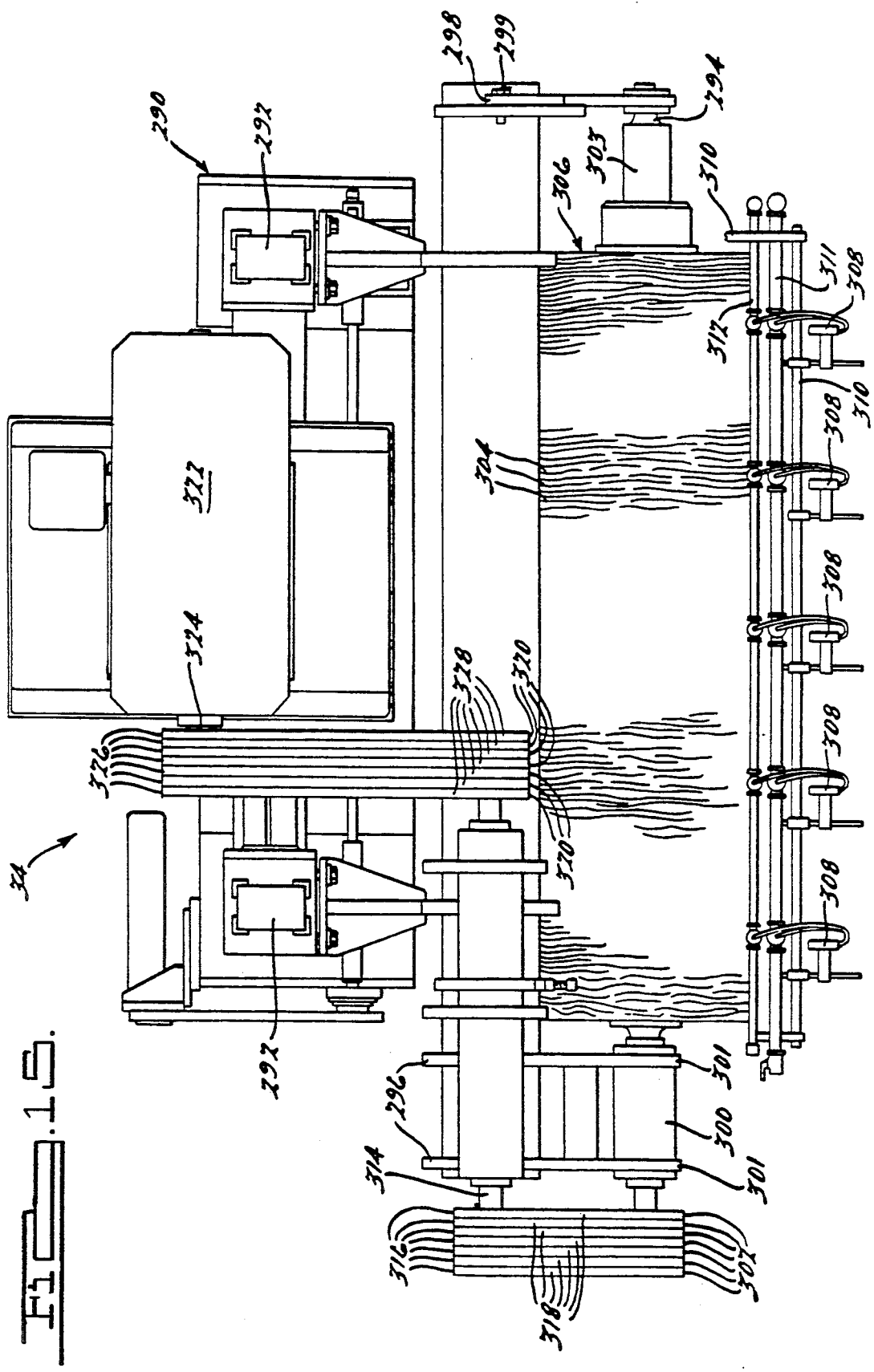

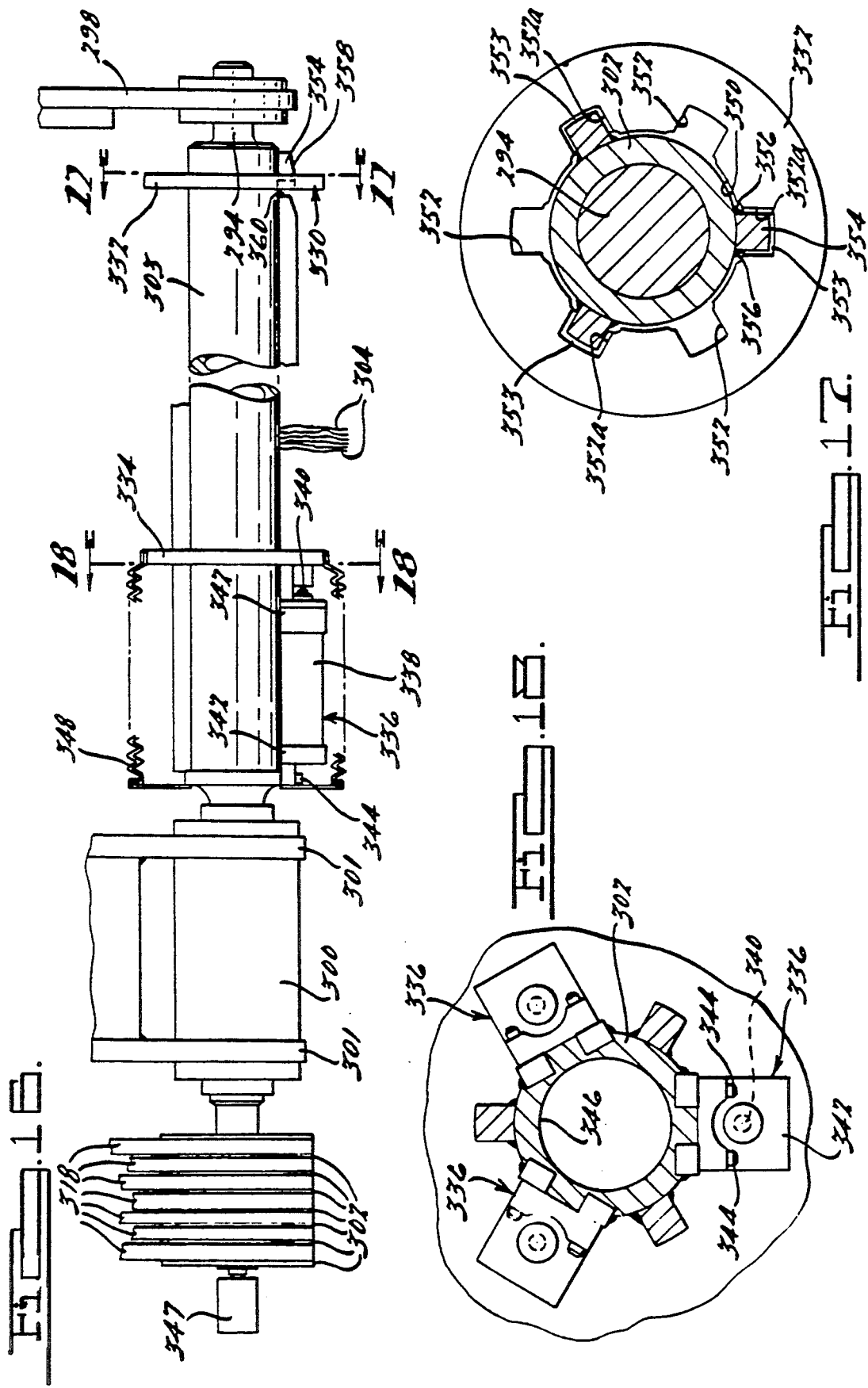

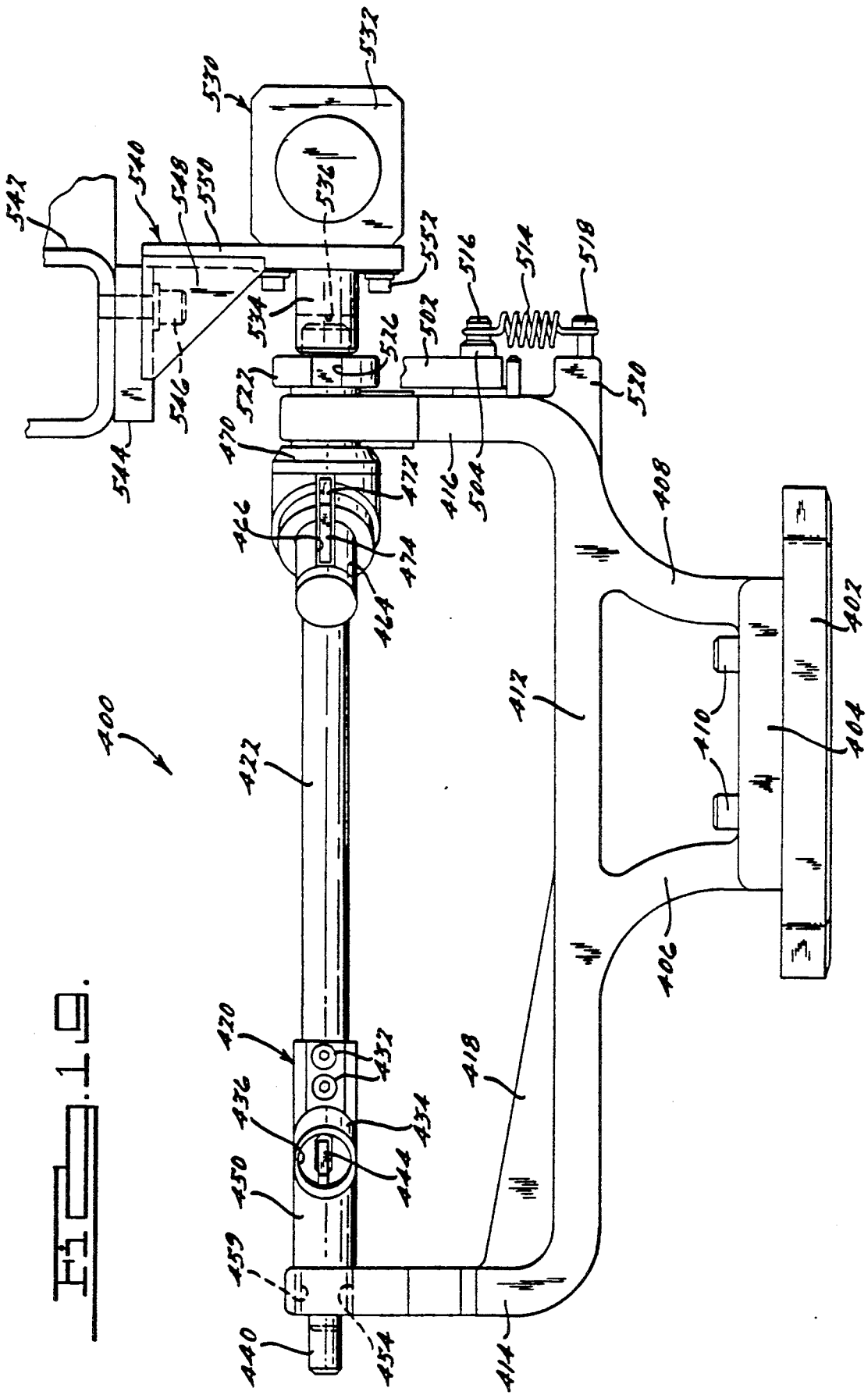

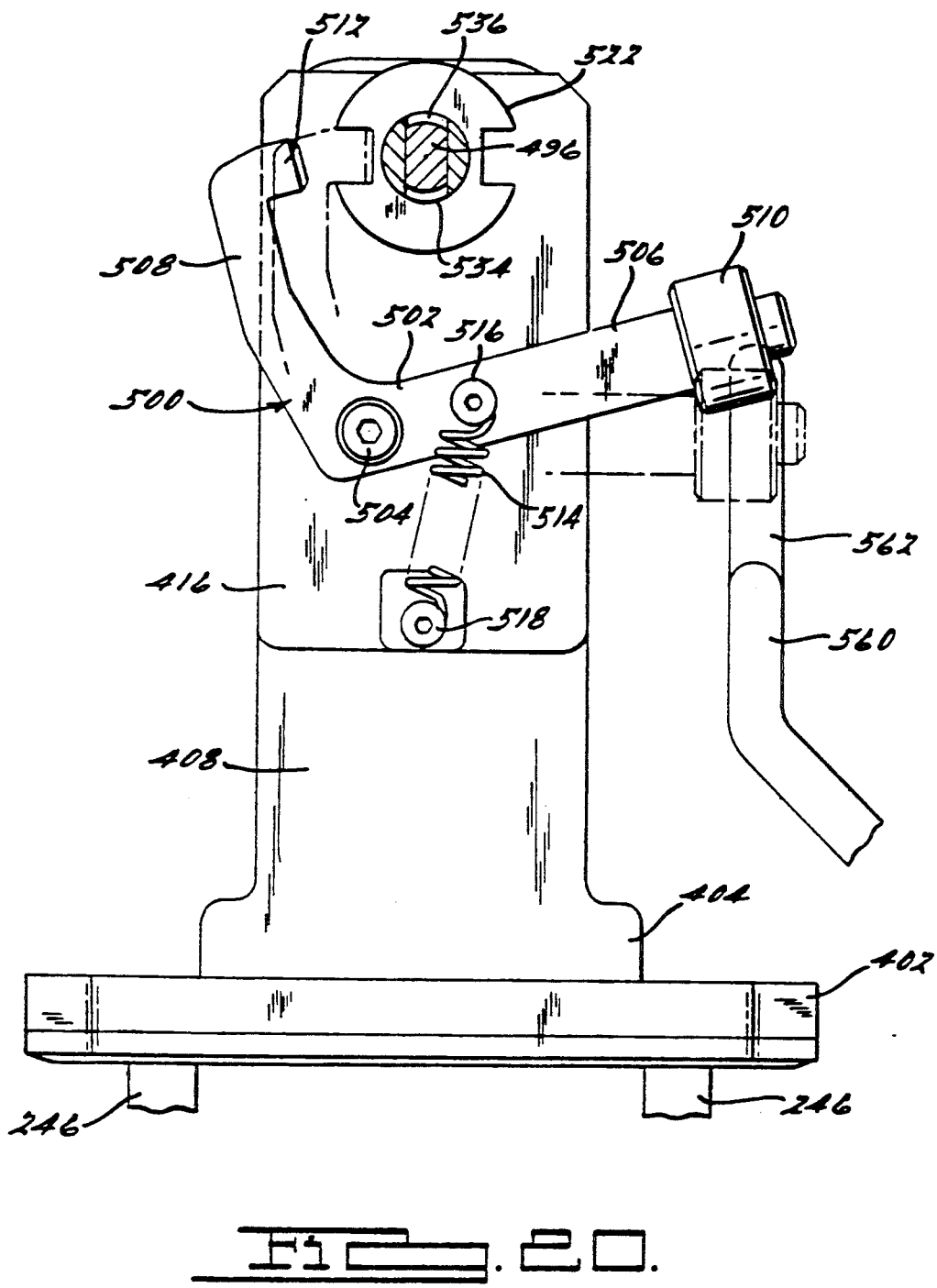

INTEGRATED BUFFING AND GRINDING SYSTEM

CROSS-REFERENCE TO RELATED APPLICATIONS

This application is a Continuation-In-Part of Ser. No. 355,684, filed May 23, 1989, which is a divisional application of Ser. No. 269,473, filed Nov. 9, 1988 and entitled "INTEGRATED BUFFING AND GRINDING SYSTEM".

BACKGROUND OF THE INVENTION

1. Field of the Invention

The present invention relates generally to a buffing and grinding system, more particularly to, an integrated buffing and grinding system.

2. Description of the Related Art

Presently, articles that are casted, machined or the like may require a finishing process. Typically, the articles are finely ground against an abrasive surface such as that of a belt or band-type sanding device. An operator generally grasps the article from a pallet or the like with its hands or a tool and moves the article into and out of contact with the abrasive surface of the sanding device. Once the grinding is completed the article is transferred to a buffing area or station on a pallet or in a batch container. Another operator will generally grasp the article and load it on a moveable table or any type of mechanism that cooperates with a buffing device at the buffing station. Once the table is loaded by the operator, the operator will activate, typically, a computer controller that will cause the moveable table to move the articles into and out of contact with the buffing wheel or wheels of the buffing device. Once the buffing is completed, the operator unloads the articles from the moveable table and places them on a Pallet.

As to the buffing device after a large number of articles have been buffed, the buffing wheel may need to be tightened and will eventually need to be replaced or repaired. This requires removal of the buffing wheel from the buffing device. Typically, a large nut which is threaded onto a shaft supporting the buffing wheel has to be unloosened and removed. The buffing wheel is then moved axially until it completely disengages the shaft.

Additionally, symmetrically shaped articles such as plumbing or faucet spouts may be held by a fixture and finished on one side such as an upper side as held by the fixture. The symmetrically shaped articles are then manually turned by an operator on the fixture and finished completely on the other side such as the lower side as held by the fixture.

One disadvantage with the above finishing process is that a large amount of repetitive manual labor is required This not only results in an expensive process, but requires a significant amount of inefficiently allocated human resources. Also, reliance is placed on the operator to repeatedly perform the job correctly for each and every article subjected to the finishing process. Another disadvantage with the above finishing process is that once the articles have been ground, they are transferred and loaded manually on the moveable table that cooperates with the buffing device. A disadvantage of the buffing device is that a large force has to be applied with a wrench to unloosen or tighten the nut which holds the buffing wheel. This mechanism also requires an unnecessary waste of time to remove and replace the buffing wheel. A further disadvantage of the fixture for symmetrically shaped articles requires an operator to manually turn the parts a predetermined amount to allow the articles to be finished completely. This results in an unnecessary amount of time and expense to finish symmetrical parts.

It is, therefore, a principle object of the present invention to provide a finishing process in which the grinding and buffing process is fully integrated.

It is an object of the present invention to provide a system with flexibility such that different articles and finishing processes can be used.

It is another object of the present invention to eliminate or substantially reduce the amount of repetitive manual labor required.

It is a further object of the present invention to eliminate or substantially reduce the amount of reliance placed on the operator.

It is a still further object of the present invention to provide an automated finishing system which will consistently grind and buff the articles to their specified finished dimensions.

It is another object of the present invention to provide a way of causing a constant amount of force to be continuously applied to the buffing wheel.

It is a further object of the present invention to automatically load and unload the moveable table that cooperates with the buffing device.

It is another object of the present invention to provide a removable article supporting fixture or pallet on the work spindles of the moveable table.

It is a still further object of the present invention to provide a quick change assembly for the buffing wheel of the buffing device.

It is yet another object of the present invention to provide a structure for automatically rotating or turning symmetrically shaped articles a predetermined amount to allow the articles to be finished completely.

It is still another object of the present invention to eliminate the need to manually turning symmetrically shaped articles a predetermined amount to allow the articles to be finished completely such as on both upper and lower sides as held by a fixture.

SUMMARY OF THE INVENTION

To achieve the foregoing objects, the present invention provides an integrated buffing and grinding system. The system includes a first conveyor for transporting an article to a grinding station. The article is grasped by a robot and brought into and out of contact with an abrasive surface of a sanding device. The article is then transferred by the robot to a second conveyor. The article travels along the second conveyor to a shuttle assembly. The article is then transferred by the shuttle assembly to a moveable table of a buffing device. The moveable table moves the article into and out of contact with a buffing wheel of the buffing device. The article is then transferred by the moveable table to the shuttle assembly. The shuttle assembly transfers the article to the second conveyor. The article travels along the second conveyor to an unloading station where it is unloaded. The system may include pallet means for allowing automatic rotation of symmetrically shaped articles to allow the articles to be finished completely.

One advantage of the present invention is that the grinding and buffing process are integrated into a single system. A second advantage of the present invention is various shaped articles and finishing processes such as deflashing, deburring, etc. can be used to provide a system with flexibility. Another advantage of the present invention is that the finishing process is essentially automated This eliminates or substantially reduces the amount of repetitive manual labor required. As a result, the amount of time required to finish an article is substantially reduced Further, the system will insure that the articles are consistently ground to their specified finished dimensions. A further advantage of the present invention is that the shuttle assembly automatically transfers the articles between the second conveyor and the moveable working table in a way which will permit several articles to be buffed at the same time. Another advantage of the present invention is that a second pallet on the second conveyor removably locks the article to it. A further advantage of the present invention is a quick change assembly for removing and replacing the buffing wheel of the buffing device. A still further advantage of the present invention is an article supporting pallet which can be removably secured to the work spindles of the moveable table. Another advantage of the present invention is that a pallet is provided to support symmetrically shaped articles and to automatically rotate or turn the articles a predetermined amount to finish the articles completely. Yet another advantage of the present invention is that the rotatable pallet eliminates manually rotating or turning of the symmetrically shaped articles a predetermined amount to allow the articles to be finished completely.

Other object, features and advantages of the present invention will be readily appreciated as the same becomes better understood by reference to the following description and accompanying drawings.

BRIEF DESCRIPTION OF THE DRAWINGS

FIG. 1 is a plan view of an overall schematic of the system according to the principles of the present invention.

FIG. 2 is a plan view of a first stopping mechanism of the first conveyor of FIG. 1.

FIG. 3 is an elevational view of the first stopping mechanism of FIG. 2.

FIG. 4 is a plan view of a second stopping mechanism and pallet unclamp/locating device of the second conveyor of FIG. 1

FIG. 9 is a side elevational view of the second pallet of FIG. 8.

FIG. 13 is a plan view of a shuttle assembly of FIG. 1.

FIG. 14 is an elevational view of the shuttle assembly of FIG. 3 and the moveable working table of FIG. 1.

FIG. 15 is a plan view of the buffing device of FIG. 1.

FIG. 16 is a partial plan view of the buffing wheel and quick change assembly of FIG. 15.

FIG. 17 is a sectional view taken along line 17—17 of FIG. 12.

FIG. 18 is a sectional view taken along line 18—18 of FIG. 16.

FIG. 19 is a front elevational view of a rotatable pallet according to the present invention.

FIG. 20 is a side elevational view of the rotatable pallet of FIG. 19.

DESCRIPTION OF THE PREFERRED EMBODIMENT(S)

Figure 5:
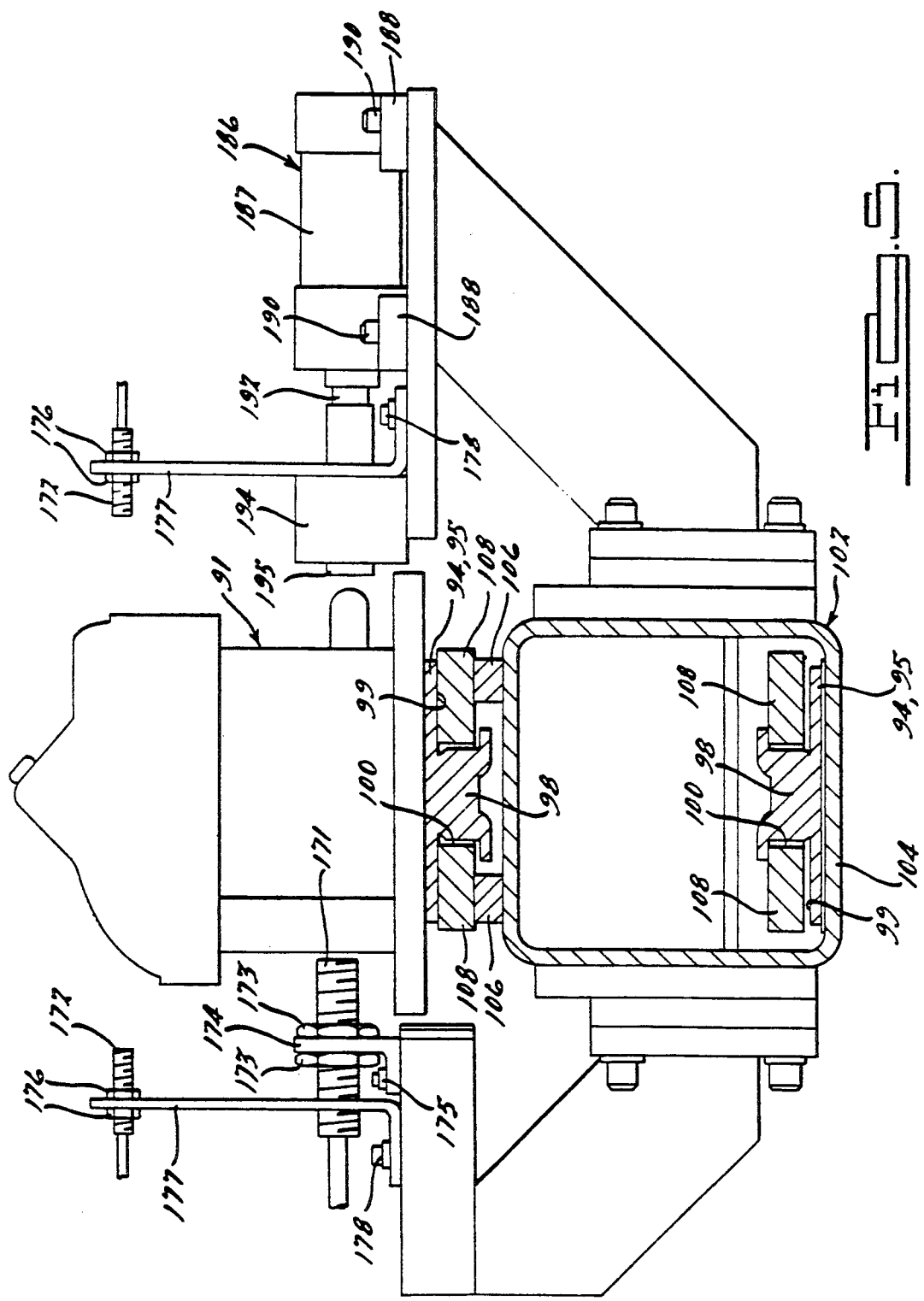
FIG. 5 is a front elevational view of the pallet unclamp/locating device of FIG. 4.

Referring to FIG. 1, an overall schematic diagram of the integrated grinding and buffing system 10 is shown. It should be appreciated that the system 10 could be used for various or multiple finishing processes, e.g. deflashing, deburring. etc. The system 10 includes a first conveyor, generally indicated at 12, for transporting a series of objects, parts or articles to be processed or finished Each article is loaded on the first conveyor 12 at a loading station, generally indicated at 14. The first conveyor 12 transports the articles in series to a cleaning station, generally indicated at 16, where moisture and foreign particles are removed from the articles with pressurized air. The first conveyor 12 then transports the articles to a finishing or grinding station, generally indicated at 18.

At the grinding station 18, an individual article is grasped by at least one of the pair of robots 20 and 22 and removed from the first conveyor 12. Each of the robots 20 and 22 then bring the article into contact with a corresponding abrasive belt grinder or sanding device 24 and 26, respectively, for grinding material from the articles. Once the grinding is completed, the robots 20 and 22 transfer the articles to a second conveyor, generally indicated at 28. The article travels along the second conveyor 28 to a shuttle assembly, generally indicated at 30. The article is transferred by the shuttle assembly 30 to load a moveable working table, generally indicated at 32. The working table 32 cooperates with a buffing device, generally indicated at 34, to buff or polish the articles. Once the articles are buffed, the working table 32 transfers the articles to the shuttle assembly 30 where they are unloaded back onto the second conveyor 28. The articles then travel along the second conveyor 28 to an unloading station, generally indicated at 36. The articles are then unloaded from the second conveyor 28. The system 10 will now be described in more detail.

Referring again to FIG. 1, the first conveyor 12 is formed in a generally L-shaped closed loop. However, it should be appreciated that the first conveyor 12 could be formed into any suitable closed loop shape. Referring to FIG. 3, the first conveyor 12 generally comprises a low friction first chain 38, preferably of plastic, which slides in a recessed track 40 supported by a first frame, generally indicated at 42. Such a chain as that described is well known in the art and may be purchased commercially from Rexnord, Mechanical Power Division, 725 South Adams, Birmingham, Mich. It should be appreciated that the first frame 42 could have any suitable shape or structure to support the first chain 38 and recessed track 40 above a support surface such as the floor.

Referring once again to FIG. 1, a drive mechanism 44 such as a motor having a ball screw and a sprocket or wheel to frictionally engage the first chain 38 is used to move the first chain 38 along the recessed track 40. The drive mechanism 44 is connected to and controlled by a main electrical control panel 46. An operator electrical control panel 47 is connected to an communicates with the main electrical control panel 46 to activate the drive mechanism 44. It should be appreciated that any suitable drive mechanism may be used to move or drive the first chain 38 of the first conveyor 12. It should also be appreciated that one skilled in the art could make or purchase the control circuitry for the control panels 46 and 47 which operate the various electrically or electronically controlled devices that may be desired for the system 10.

The first conveyor 12 also includes a rotatable guide 48 at each corner of its configuration to assist the first chain 38 in moving around the corner. The rotatable guide 48 generally comprises a circular wheel pivotally supported by the first frame 42 of the first conveyor 12 to rotate as the first chain 38 is moved by the drive mechanism 44. It should be appreciated that other suitable devices could be used to assist the first chain 38 in moving around generally square corners.

Referring to FIG. 2, a more detailed view of the loading station is shown. At the loading station 14, each article is loaded on a transfer fixture or first pallet, generally indicated at 50, which travels along the first conveyor 12. The article may be loaded manually by a person or automatically by a robot 49, transfer device or the like. It should be appreciated that the article could be loaded on the first conveyor 12 by any type of device or in any manner.

Referring now to both FIGS. 2 and 3, the first pallet 50 is shown to be generally rectangular in shape. The pallet 50 also has an outwardly protruding track engaging portion 52 at its bottom 54 which is shaped to engage the first chain 38 and slide in the recessed track 40 of the first conveyor 12. The track engaging portion 52 is generally rectangular in shape with arcuate ends and frictionally engages the first chain 38 due to the weight of the first pallet 50. The first pallet 50 is made preferably of plastic and weighs approximately one (1) to one and a half (1 ½) pounds. The first pallet 50 moves with the first chain 38 along the recessed track 40. The first pallet 50 may have a platform 56 having a predetermined shape formed on its upper surface 58 to hold the article to be finished (shown in phantom lines in the figures). It should be appreciated that the first pallet 50 may have any shape and be made of almost any type of material. It should also be appreciated that the platform 56 can have any predetermined shape to hold and secure the article on the first pallet 50. For example, the platform 56 may be complimentary in shape to that of the article it supports.

At the loading station 14 of FIG. 1, a meter or first escapement mechanism is generally indicated at 60 Referring to FIGS. 2 and 3, the first escapement mechanism 60 is shown to include a fixture or pallet presence switch or sensor 62 to determine if a first pallet 50 is present or adjacent it, and a pair of part or article present switches or sensors 63 to determine or sense if an article is present on the first pallet 50. The first escapement mechanism 60 also includes at least a pair of pneumatically controlled pallet stopping devices 64 and 64a that alternately stop the flow of first pallets 50 along the conveyor 12. The first escapement mechanism 60 also includes a pallet locating device 64b which engages and locates the first pallet 50 once it is stopped. The sensors 62 and 63 may comprise a photo. electric eye secured to the first frame 42 by means such as nuts 65 and brackets 66 to sense whether a first pallet 50 is present and whether an article is present on the first pallet 50. If so, the sensors 62 and 63 send a signal to the main electrical control panel 46 which relays a signal to actuate the pallet locating device 64b.

The pallet stopping devices 64 and 64a and the pallet locating device 64b each comprises a cylinder 67 retained and supported by brackets 68 at both ends to the first frame 42. The brackets 68 are secured by fasteners 70 to the first frame 42. The cylinder 67 has a piston (not shown) therein and a piston rod 72 having one end connected to the piston and the other end extending axially outwardly of one end of the cylinder 67. The cylinder 67 is connected to, preferably, a source of pressurized air (not shown) to move the piston and piston rod 72. It should be appreciated, however, that pressurized hydraulic fluid could be used. The other end of the piston rod 72 is connected to a plate member 74 and secured between nuts 76 threaded on the end of the piston rod 72. A pallet engaging or stopping member 78 is generally rectangular in shape and slides in a passageway or track 79 formed between the brackets 68. The pallet engaging member 78 has one end 80 secured by a fastener 82 to the plate member 74. The other end of the pallet engaging member 78 has inclined portions 84 forming a point 85. The inclined portions 84 engage corresponding inclined portions 86 on the four corners of the first pallet 50 to stop the first pallet 50. The point 85 on the pallet locating device 85b engages a "V" shaped pocket 87 in the side of the first pallet 50 to prevent the first pallet 50 from being cocked or misaligned in the track 40.

When the pallet 50 is restrained by the pallet engaging members 78 and 78a of the pallet stopping devices 64 and 64a, respectively. and pallet locating device 64b, the conveyor 12 will, of course, continue to run by sliding under the first pallet 50. When the pallet engaging member 78 engages the first pallet 50, a pallet engaged limit switch (not shown) is triggered to send a signal to the main electrical control panel 46 that the first pallet 50 is engaged. It should be appreciated that the pallet stopping and locating devices 64, 64a and 64b are all similar. It should also be appreciated that any type of conventional limit switch could be used.

As illustrated in FIG. 2, the first pallet stopping device 64 is located on one side of the first conveyor 12 and the second pallet stopping device 64a is located on the same side laterally spaced behind the first behind the first pallet stopping device 64 on the other side of the first conveyor 12. The main control panel 46 sends a signal to actuate the first stopping device 64 to extend the pallet engaging member 78 and to actuate the second stopping device 64a to retract its pallet engaging member 78a. The first stopping device 64 stops an incoming first pallet 50. When the pallet presence sensor 62 senses a first pallet 50 present and the article present sensor 63 senses the absence of an article on the first pallet 50, a signal from the main electrical control panel 46 is sent to a solenoid (not shown) to allow the pressurized air to the cylinder 67 of the pallet locating device 64b actuates to move the piston, piston rod 72b and pallet engaging member 78b to move such that the point 85b is disposed in the pocket 87 of the first pallet 50.

After the article is loaded on the first pallet 50 and the robot arm is clear of the first escapement mechanism 60, a signal is sent from the main electrical control panel 46 to the pallet locating device 64b to retract the pallet engaging member 78b. The main electrical control panel 46 sends another signal to retract the pallet engaging member 78 of the first pallet stopping device 64 and extend the pallet engaging member 78a of the second pallet stopping device 64a to stop or limit the flow of first pallets 50 along the first conveyor 12. The first escapement mechanism 60 provides on-line accumulation of the pallets 50 while the low-friction first chain 38 continues to slide under the first pallets 50.

Referring to FIG. 1, a second pallet presence switch or sensor 88 is located on the first conveyor 12 downstream of the first escapement mechanism 60. The second pallet presence sensor 88 is similar to the first pallet presence sensor 62, previously described. If the first pallets 50 back up on the first conveyor 12 to trigger the second pallet presence sensor 88 for a predetermined time period, the main electrical control panel 46 will prevent the first escapement mechanism 60 at the loading station 14 from releasing first pallets 50 until the second pallet presence sensor 88 is clear.

Figures 11, 12:
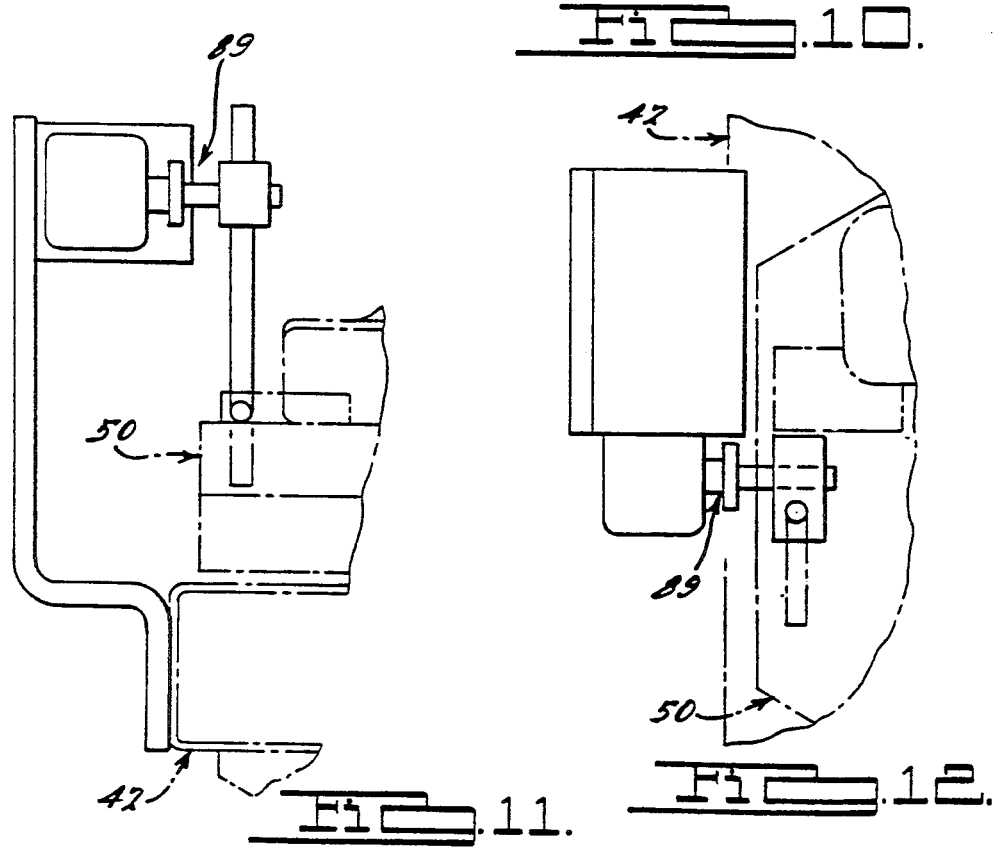
FIG. 11 is an elevational view of a limit switch on the first conveyor of FIG. 1.
FIG. 12 is a plan view of the limit switch of FIG. 11.

The first pallets 50 move along the first conveyor 12 to an article cleaning or air blow-off station 16 The air blow-off station 16 generally comprises a hood or housing supported by the frame 42 of the conveyor 12 about a section of the conveyor 12. At least one air nozzle (not shown) is connected to a source of pressurized air and is mounted within the housing and directed at the chain 38. A limit switch, generally indicated at 89 (and shown in FIGS. 11 and 12), is engaged and tripped by the pallet 50, sending a signal to the main electrical control panel 46, which turns on the pressurized air from the air source that flows through the nozzles to blow moisture and any foreign particles off the articles for a predetermined time period. After the predetermined time period, if the limit switch 89 is not tripped again, the pressurized air will be turned off. The first pallet 50 then travels along the first conveyor 12 to a grinding station 18. While the limit switch 89 shown in FIGS. 11 and 12 is an Allen-Bradley limit switch, other suitable switches may be employed in the appropriate application.

At the grinding station 18, at least one, preferably a pair of robot pickup stations, generally indicated at 90 and 90a, are located adjacent a section of the first conveyor 12. A pair of robots 20 and 22 are located adjacent the robot pickup stations 90 and 90a, respectively. Such a robot 20 and 22 could be a GMF Model S-100R robot which may be purchased commercially from GMF Robotics, 2000 South Adams Road, Auburn Hills, Mich. It should be understood that a variety of different robots may be utilized for the system 10, and that these particular robots have been identified for exemplary purposes only. It should also be appreciated that each of the robots will be controlled by a computer (not shown) which communicates with the main electrical control panel 46 Each robot 20 and 21 also has an article presence switch or sensor (not shown) on its arm. Further, belt or band, type grinders 24 and 26 are located laterally of the robots 20 and 22, respectively. Such a band-type grinder or polisher is a ABH4 grinder which is conventional and may be purchased commercially from ACME Manufacturing Company, 850 West Twelve Mile Road, Madison Heights, Mich. Each grinder 24 and 26 also has an article presence switch or sensor (not shown). While grinders are shown as part of an initial finishing station in the system 10, other suitable finishing devices may be employed in the appropriate application.

At each robot pickup station 90 and 90a, an escapement mechanism, similar to the first escapement mechanism 60, previously described, is also located. The first escapement mechanism 60 at the first robot pickup station 90 is sequentially controlled to either stop the first pallet 50 or let it go through to the second robot pickup station 90a. It should be appreciated that either robot 20 or 22 can "work" or be operated and the first stopping mechanisms 60 sequenced such that each robot 20 and 22 receives a first pallet 50 having an article on it.

At the first robot pickup station 90, the first escapement mechanism 60 operates similar to the first escapement mechanism 60 at the loading station 14. Once a first pallet 50 is stopped and engaged, the first robot 20 has an end effect or hand which is connected to a source for creating a suction or vacuum to pick up the article and hold it. The first robot 20 is actuated to move the article off the first pallet 50 to the first grinder 24. Once the first robot 20 has picked up the article, the article present switch on the end of its arm will confirm that this has occurred. The first robot 20 will then sequentially move the article into and out of contact or engagement with the abrasive surface of the first grinder 24 to grind or Polish the article to predetermined dimensions. When the first robot 20 is finished grinding the article, the first robot 20 will place it on a locking fixture or second pallet, generally indicated at 91 (FIGS. 8 through 10), which is supported on the second conveyor 28. The article is blown out of the hand of the first robot 20 by pressurized air connected to it. It should be appreciated that the second robot 22 operates substantially the same as the first robot 20 to remove the article, grind it, and place it on one of the second pallets 91 of the second conveyor 28.

Once the arm of the first robot 20 is clear of the first escapement mechanism 60 at the first robot pickup station 90, a signal is given by the main electrical control panel 46 to the first escapement mechanism 60 to release the emptied first pallet 50. A pair of laterally spaced pallet presence sensors 92 and 93 are located along the first conveyor 12 between the first 90 and second 90a robot pickup stations If first pallets 50 backup on the first conveyor 12 to trigger the pallet presence sensor 92, the first escapement mechanism 60 at the first robot pickup station 90 will be prevented by the main electrical control panel 46 from releasing any first pallets 50 until the sensor 92 is clear. Also, if the pallet presence sensor 92 is not triggered, the main electrical control panel 46 will cycle the first escapement mechanism 60 at the first robot pickup station 90 until the sensor 92 is triggered. It should be appreciated that empty pallets from the robot pickup stations 90 and 90a are conveyed back to the loading station 14.

Referring to FIG. 1, the second conveyor 28 is formed in a generally rectangular shaped closed loop. The second conveyor 28 comprises two separate closed loop second chains 94 and 95 which act as one closed loop chain. It should be appreciated that the second conveyor 28 could be formed to any desired shape and could have a single closed loop chain. However, two chains are preferred due to the weight of the second pallets 91. Each second chain 94 and 95 has its own corresponding drive mechanism 96 and 97 similar to that of the first conveyor 12. Such a conveyor may be purchased commercially from Rexnord, Mechanical Power Division, 725 South Adams, Birmingham, Mich.

Referring to FIG. 5, the second conveyor 28 includes the low friction second chains 94 and 95 which are generally planar and has a downwardly protruding portion 98 on its bottom surface 99 which slides in a channel or track 100 supported by a second frame, generally indicated at 102. The second frame 102 includes a generally rectangular tubular member 104. The tubular member 104 supports stacked plate members 106 and 108 which form the track 100 for the second chains 94 and 95. The second chains 94 and 95 slide along the track 100 and return inverted through the tubular member 104. It should be appreciated that the second frame 102 could have any shape or structure to support the second chain above a support surface such as the floor.

The second pallet 91 supports the article and frictionally engages the second chains 94 and 95 due to its weight and travels along the second conveyor 28. The second pallet 91 is preferably made of metal and weighs approximately twenty-five (25) pounds. It should be appreciated, however, that the second pallet 91 could be made of any type of material to support the article during the second finishing operation to be discussed below.

Figure 8:
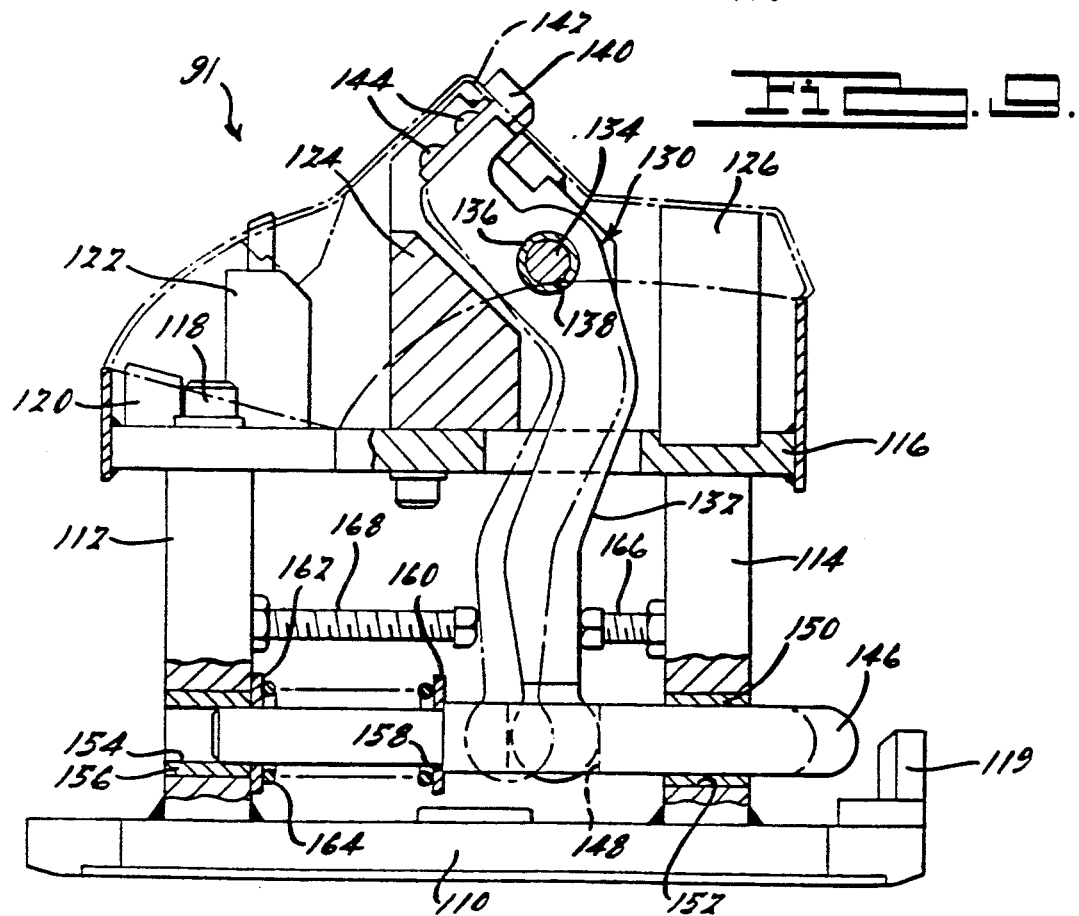
FIG. 8 is a front elevational view of a second pallet used on the second conveyor of FIG. 1.
Figure 10:
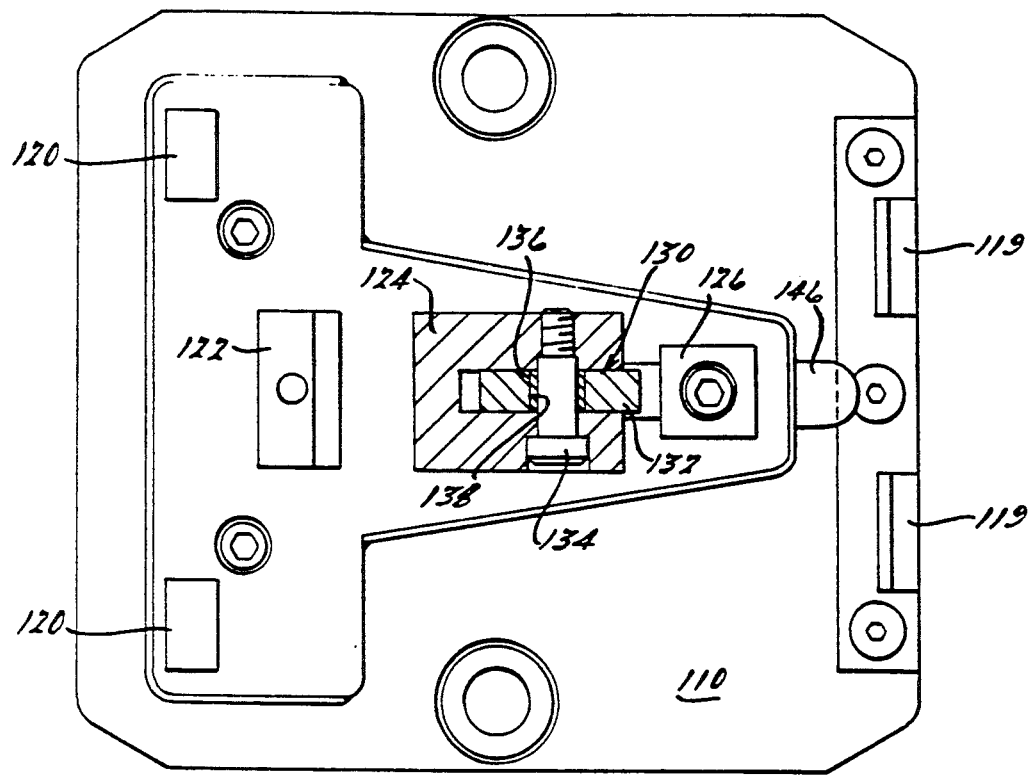
FIG. 10 is a plan view partially broken away of the second pallet of FIG. 8.

Referring to FIGS. 8 through 10, the second pallet 91 comprises a base member 110 which engages chains 94 and 95 and moves along the track 100, a pair of spaced upright or vertical support members 112 and 114 connected at one end to the base member 110 and a top plate member 116 connected at the other end of the support members 112 and 114. The support members 112 and 114 are secured to the base member 110 by welds and the top plate member 116 is secured to the support members 112 and 114 by fasteners 118. The base member 110 also has a pair of spaced upright flanges 119 along one side. The second pallet 90 further includes a plurality of platform members 120. 122, 124, 126 extending upwardly from the top plate member 116. These platform members are used to define a predetermined shape which is capable of supporting the article as shown by phantom lines in the figure. It should be appreciated that the second pallet 91 may have a platform of any predetermined shape on the upper surface of the top plate member 116 which is capable of holding and supporting the article to be finished. Thus, for example, the platform members 120-126 define a contoured surface which is generally complementary in shape to the underside shape of the article to be finished.

The second pallet 91 further includes a unique locking arrangement, generally indicated at 130 to removably secure the article to the second pallet 90. The locking arrangement 130 includes a lever arm 132 pivotally supported by a fastener 134. The fastener 134 is enclosed by a bushing 136 which extends through an aperture 138 in the lever arm 132. The fastener 134 threadably engages platform member 124 and is secured thereto. As illustrated in FIG. 9, the lever arm 132 includes an L-shaped ketch member 140 at one end which cooperates with the upper surface 142 of platform member 124 to removably secure the article therebetween. The ketch member 140 is secured to the lever arm 132 by a plurality of fasteners 144.

The lever arm 132 is actuated by a push rod 146 at its lower end. The push rod 146 is generally circular and located planar to the base member 110. The push rod 146 has an aperture 148 formed in it and the lower end of the lever arm 132 is spherically shaped and disposed in the aperture 148. The push rod 146 has one end disposed in a bushing 150 press-fit into a corresponding aperture 152 formed in the vertical support member 114, such that the push rod extends outwardly of the vertical support member 114. The other end of the push rod 146 is disposed in a bushing 154 press-fitted in a corresponding aperture 156 formed in the vertical support member 112. The push rod 146 includes a shoulder 158 formed thereon. A washer 160 abuts the shoulder 158 and another washer 162 abuts the vertical support member 112. A spring 164 is disposed about the push rod 146 between washers 160 and 162 to bias the push rod 146 such that the ketch member 140 engages or contacts the surfaces 142 of the form member 124. A first fastener 166 threadably engages the vertical support member 114 to limit the movement of the lever arm 32 and the preload on the article. A second fastener 168 threadably engages the vertical support member 112 to limit the movement of the lever arm 132 toward the vertical support member 112.

Referring to FIG. 1, across from each robot 20 and 22, a second escapement mechanism, generally indicated at 170, is located along the second conveyor 28 to stop a second pallet 91 until it is loaded with an article that has been processed or finished by the robots 20 22. Referring to FIGS. 4 and 5, the second escapement mechanism 170 includes a pallet presence sensor 70 and a pair of article present sensors 172 similar to the pallet presence sensor 62 and article present sensor 63 of the first escapement mechanism 60. The pallet presence sensor 171 secured by nuts 173 to L-shaped bracket 174 which is, in turn, secured by fasteners 175 to the second frame 102. The pallet presence sensor 171 determines or senses whether a second pallet 91 is present. The second escapement mechanism 170 also includes a pair of article present sensors 172 each located on opposite sides of the second chain 94, 95 to determine or sense whether an article is present on the second pallet 91. The article present sensors 172 are secured by nuts 176 to L-shaped bracket members 177 which are, in turn, secured by fasteners 178 to the second frame 02.

Figure 6:
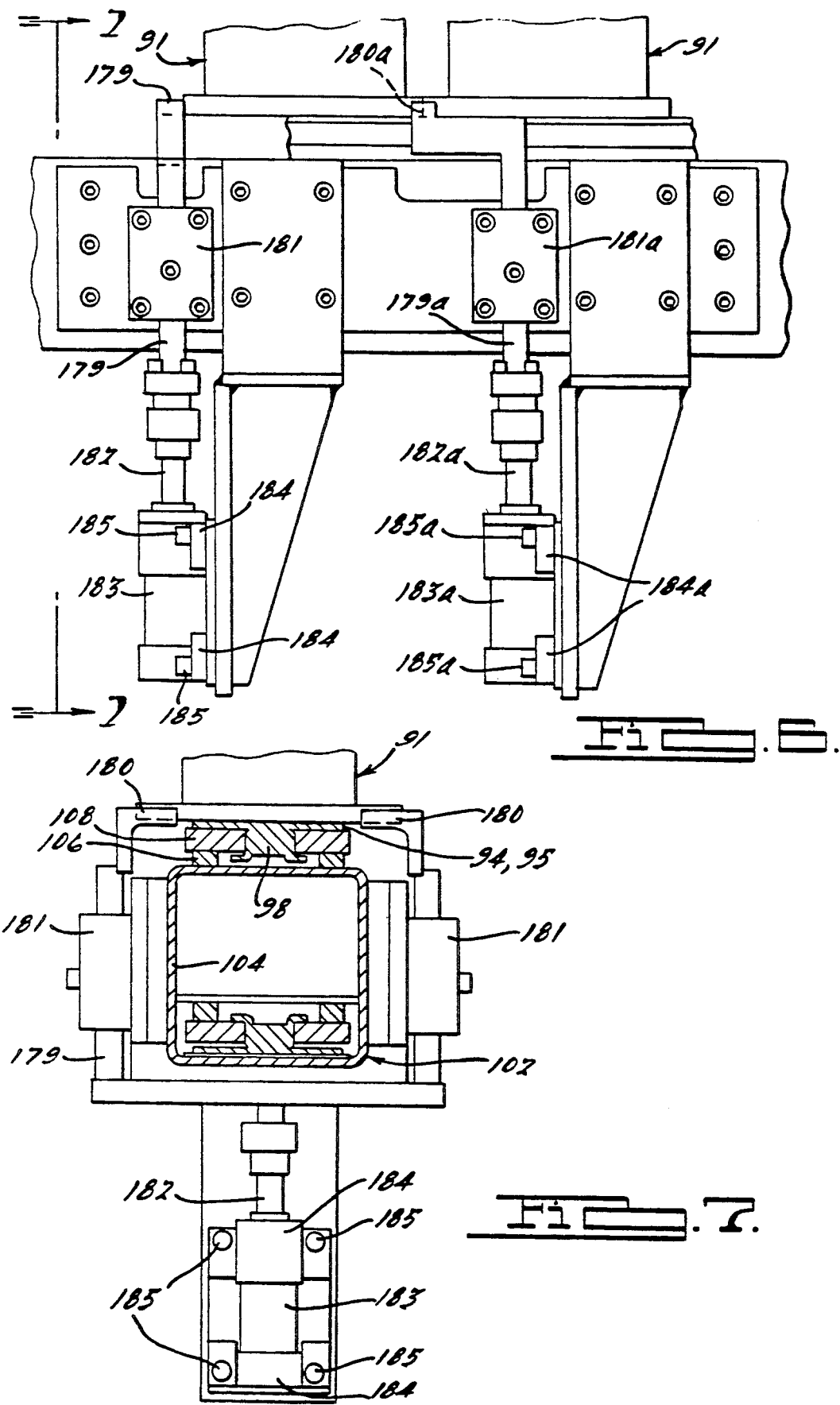
FIG. 6 is a front elevational view of the second stopping mechanism of FIG. 4.
Figure 7:
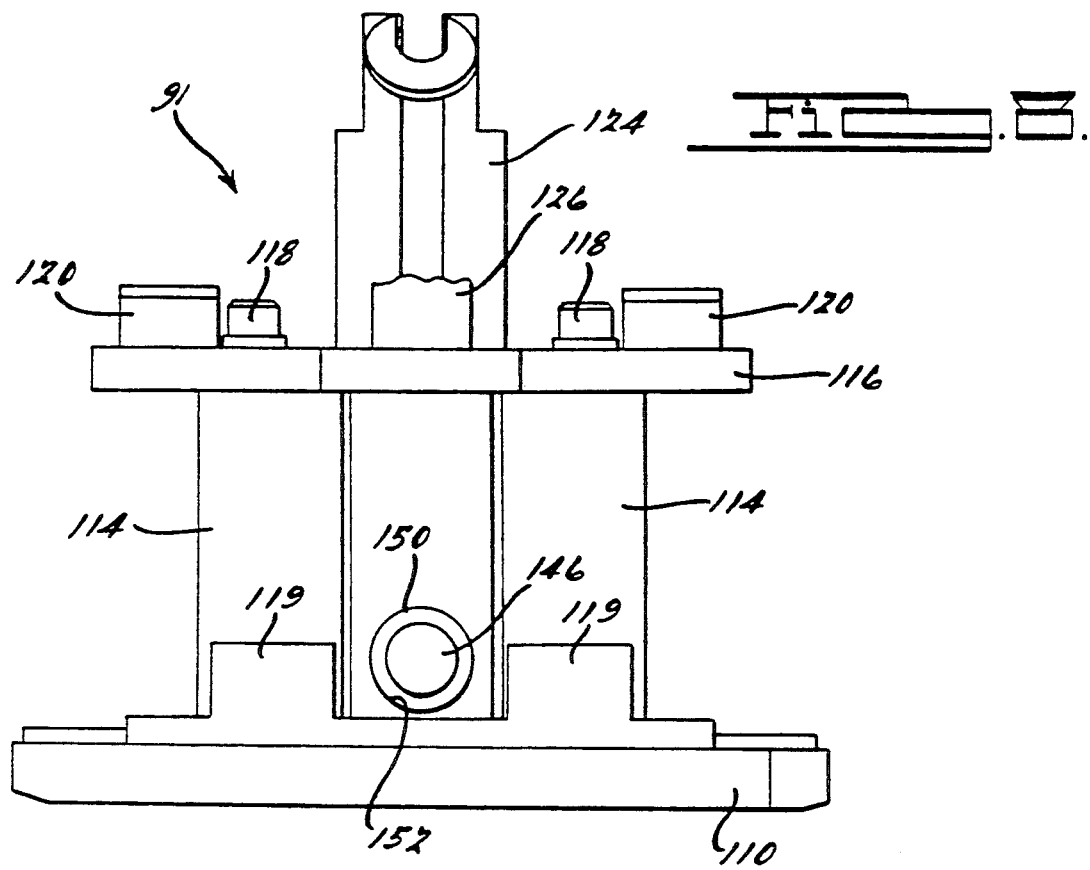
FIG. 7 is a side elevational view of the second stopping mechanism of FIG. 4.

Referring to FIGS. 4, 6 and 7, the second escapement mechanism 170 includes a pair of laterally spaced and generally U-shaped bars 179 and 179a having inwardly extending pallet engaging flanges 180 and 180a at the free end. The U-shaped bars 179 and 179a are guided in their up and down movement by guide bearings 181 secured to the second frame 102. The bars 179 and 179a are connected to a corresponding piston rod 182 of a pneumatic cylinder 183 to move the bars 179 and 179a up and down relative to the chain 94, 95. The pneumatic 183 and 183a are retained by brackets 184 to the second frame 102 and the brackets 184 are secured to the frame 102 by fasteners 185. The pneumatic cylinders 183 and 183a are sequentially controlled by the main electrical control panel 46 to stop a second pallet 91 by a first bar 179 engaging the base member 110 of the second pallet 91.

Referring to FIGS. 4 and 5, a pallet unclamp/locating device 186 is located at each second escapement mechanism 170 on the second conveyor 28 across from the robots 20 and 22. The pallet unclamp/locating device 186 includes a cylinder 187 retained by brackets 188 to the second frame 102. The brackets 188 are secured by fasteners 190 to the second frame 102 The cylinder 187 has a piston (not shown) therein and a piston rod 192 connected to the piston and extending axially outwardly of one end of the cylinder 187. The cylinder 187 is connected to a source of pressurized air (not shown) to move the piston and piston rod 192 axially. A push block 194 is connected to the other end of the piston rod 192. The push block 194 has a projection 195 conforming to the shape of the end of the push rod 146 for cooperating with the push rod 146. When the piston rod 192 is extended, the push block 194 engages the push rod 146 and displaces the lever arm 132, in turn, disengaging the ketch member 140 from the article. When the piston rod 192 is retracted, the push block 194 disengages the push rod 146 and the lever arm 132 returns to its original position with the ketch member 140 engaging the article. It should be appreciated that a second escapement mechanism 170 and a pallet unclamp/locating device 186 is located along the second conveyor 28 across from the second robot 22 and operates similar to that previously described.

If a second pallet 91 is detected with no article on it by the article present sensors 172, the main electrical control panel 46 will signal the pallet unclamp/locating device 186 to engage the second pallet 91. After the pallet unclamp/locating device 186 has engaged the second pallet 91 and triggered a limit switch (not shown), the first robot 20 will receive a signal from the main electrical control panel 46 to load the second pallet 91. Once this occurs as confirmed by the article present sensors 171 and the arm of the robot 20 is clear of the second escapement mechanism 170, the main electrical control panel 46 will give a signal to the pallet unclamp/locating device 186 to disengage the second pallet 91. The main electrical control panel 46 then gives another signal to the second escapement mechanism 170 to actuate and release the second pallet 91. It should be appreciated that the operation is the same for the second escapement mechanism 170 and pallet unclamp/locating device 186 across from the second robot 22.

Between the second escapement mechanism 170 across from the first 20 and second 22 robots, a pallet presence sensor 198 is located. The pallet presence sensor 198 is similar to the pallet presence sensor 171. In the event that the first robot 20 is not operating, the second escapement mechanism 170 across from the first robot 20 will only release second pallets 91 when the pallet presence sensor 198 is not triggered. In the event that the second robot 22 is not operating, second pallets 91 will back-up to trigger pallet presence sensor 198, preventing the second escapement mechanism 170 across from the first robot 20 from releasing second pallets 91. The pallet presence sensor 171 will turn ON a warning light at an operator electrical control panel 47 which communicates with the main electrical control panel 46. If the operator wishes to continue the operation, it must activate a manual override switch (not shown) that will allow the second escapement mechanism 170 across from the first robot 20 to pass second pallets 91 through it. Once the second pallet 91 is released, the second pallet 91 travels along the second conveyor 28 to a second escapement mechanism 170a adjacent the entry of the shuttle assembly 30.

The second escapement mechanism 170a controls the feed to shuttle assembly 30. The second escapement mechanism 170a will allow second pallets 1 with articles on them to pass through until the shuttle assembly 30 is fully loaded. Second pallets 91 that do not contain an article will be stopped by the second escapement mechanism 170a which will, in turn, activate or turn ON a light at the operator electrical control panel 47 to indicate that a second pallet 91 is without an article. The main electrical control panel 46 will shut down the second escapement mechanism 170a. The operator must purge the shuttle assembly 30 and reset the second escapement mechanism 170a in a manner to be described.

At the shuttle assembly 30, a plurality of shot bolts or third pallet stopping devices, generally indicated at 200, are located and spaced along a work station section of the second conveyor 28. Preferably, five of the third pallet stopping devices 200 are used. However, it should be appreciated that the number of stopping devices 200 will depend upon the particular application of the system 10. Each of the third pallet stopping devices 200 is similar to the pallet stopping devices of the second escapement mechanism 170. Each third pallet stopping device 200 has one U-shaped bar 202 that moves up above the plane of the second chain 94 to engage and stop the second pallet 91 and down below the plane of the chain to disengage and allow the second pallets 91 to pass by it. The bar 202 is connected to a piston rod (not shown) of a pneumatic cylinder (not shown) secured to the second frame 102 When five of the second pallets 91 have been sequentially stopped, the shuttle assembly 30 moves the five second pallets 91 in unison to a loading position to be described. It should be appreciated that corresponding limit switches are used with the third stop mechanisms 200 to monitor the movements of the bar 202.

Referring to FIGS. 13 and 14, the shuttle assembly 30 is shown. The shuttle assembly 30 includes a secondary support frame, generally indicated at 210, mounted on the upper surface 212 of the second frame 102. The secondary support frame 210 comprises a plurality of longitudinally and laterally spaced vertical support columns 214 supported upon a pair of laterally extending and longitudinally spaced support beams 216. The support beams 216 are secured to the second frame 102 by means such as welds 217. A plate member 218 is secured to the upper ends of a pair of support columns 214. In this particular embodiment, a total of three plate members 218 are used. Upon the center plate member 218, a drive cylinder 220 is retained by brackets 222 to the plate member 218. The brackets 222 are secured by fasteners 224 to the plate member 218. The drive cylinder 220 includes a piston (not shown) slideably disposed therein for reciprocal movement. A source of pressurized air is connected to the drive cylinder 220 to move the piston. A piston rod 226 is connected to one end of the piston and extends axially outwardly from one end of the drive cylinder 220. An L-shaped member 228 is secured to the other end of the piston rod 226. The horizontal portion of the L-shaped member 228 is secured by means such as fasteners 230 to a horizontal drive bar 232. The drive bar 232 extends laterally along a section of the second conveyor 28. A contact bar 233 extends downwardly from the free end of the drive bar 232 to contact the base member 110 of the second pallets 91. The drive cylinder 220 pushes and pulls the drive bar 232 to move the second pallet 91 back and forth across the second conveyor 28. It should be appreciated that corresponding limit switches are used with the drive cylinder 220 to monitor the movements of the drive bar 232.

Upon the end or other two plate members 218, a guide assembly generally indicated at 234, is mounted. The guide assembly 234 includes a pair of longitudinally spaced bearing blocks 236 secured by means such as fasteners 238 to the corresponding plate member 218. The bearing blocks 236 have an aperture (not shown) communicating axially through them. A guide rod 240 is disposed in the apertures and has one end connected to a corresponding L-shaped member 228, previously described. The L-shaped member 228 is secured by means such as fasteners 230 to the drive bar 232. The guide assemblies 234 guide or maintain alignment of the drive bar 232 substantially parallel to the track 100 as it is moved by the drive cylinder 220.

Across the second conveyor 28 from the drive bar 232, a plurality of L-shaped support angles 242 are secured to the second frame 102. A pair of longitudinally spaced and laterally extending support rails 244 are secured to the horizontal portion of the support angles 242. A plurality of longitudinally extending skid rails 246 are secured to the support rails 244. The skid rails 246 are spaced along the support rails 244 to form a plurality of loading (dotted lines) and unloading (phantom lines) stations for guiding the movement of the second pallets 91 as shown in FIG. 13. The number of loading and unloading stations formed should, of course, correspond to the number of stopping locations on the conveyor 28 at this work station (i.e., 5). The skid rails 246 support and guide the second pallets 91. A laterally extending keeper bar 248 with a pair of limit switches (not shown) are disposed between the second chain 90 of the second conveyor 28 and one end of the skid rails 246. The keeper bar 248 is connected to and supported by a piston rod 250 (partially shown) of a pair of pneumatic cylinders (not shown), previously described, at its ends which are secured to the second frame 102. The cylinders move the keeper bar 248 up and down to allow or prevent the drive bar 232 from moving the second pallets 91 to the loading positions and the unloading positions on the skid rails 246. In other words, the keeper bar 48 forms a moveable wall on one side of the conveyor 28.

As illustrated in FIG. 14, a pallet presence sensor 252 is supported by an L-shaped bracket 254 which is secured by means such as a fastener 256 to the second frame 102. The pallet presence sensor 252 is located below each loading station of the shuttle assembly 30 adjacent each third pallet stopping device 200. The pallet presence sensor 252 is similar to the pallet presence sensors previously described. When the pallet presence sensor 252 detects or senses a second pallet 91, it sends a signal to the main electrical control panel 46, which relays a signal to actuate the appropriate third pallet stopping device 200.

A terminal clear sensor 258 is secured by nuts 260 to a horizontal plate member 262 which is supported above the unload stations of the shuttle assembly 30 by a post 264. The post 264 may be secured to the support rails 44 by means such as welds. The terminal clear sensors 258 are similar to the pallet presence sensors 252 and detect or sense whether a second pallet 91 is present in the unloading stations. When the terminal clear sensors 258 sense the presence of second pallets 91 in the unloading stations, they send a signal to the main electrical control panel 46, which relays a signal to actuate the keeper bar 248.

Correspondingly a clamp assembly, generally indicated at 266, is mounted to the drive bar across from each unloading station. The clamp assembly 266 includes a C-shaped clamp member 268 having downwardly extending fingers 270 at the ends which engage and disengage the upright flanges 119 of the base member 110 on the second pallet 91 The clamp member 268 is pivotally supported by a shaft 272 between a pair of laterally spaced side members 274. A pneumatic cylinder 276 having an axially extending piston rod 278 is connected to each clamp member 268 to pivot it between an engaged and disengaged position with the base member 110 of the second pallet 91.

Referring to FIG. 14 a multiple-axis moveable or working table 32 is located across from the shuttle assembly 30 and operatively cooperates with the shuttle assembly 30 to transfer the second pallets 91 in the loading position to a buffing mechanism 34 (FIG. 15). The working table 32 is a multiple-axis or RT5 work table which may be purchased commercially from ACME Manufacturing Company, 850 West Twelve Mile Road, Madison Heights, Mich. The working table 32 includes a base 280 having rollers 281 which translate along a pair of rails 282 for longitudinal movement. The working table 32 includes a work spindle support 283 having rollers 284 which translate along a pair of rails 285 connected to the base 280 for lateral movement.

The working table 32 further includes five work spindles, generally indicated at 286, that have a clockwise and counter-clockwise rotation with synchronized movement. The work spindle 286 includes at least one, preferably a plurality of plate members 287 on which the base member 110 of the second pallet 91 rests and is supported. The work spindle 286 further includes a pair of laterally spaced U-shaped clamps 288 which move vertically up and down to engage and disengage the second pallet 91. The work spindle 286 includes a cylinder (not shown) has a piston (not shown) and a rod 289 with one end connected to the piston. The other end of the rod 289 is connected to clamps 288. The cylinder is connected to either a source of pressurized air or hydraulic fluid to move the rod 289 and clamps 287 up and down to engage and disengage the base member 110 of the second pallet 91. It should be appreciated that each work spindle 286 has its own high torque anti-backlash gear box with an "X" axis range of 42", "Y" axis range of 12", and a "Z" axis with 360° spindle rotation. It should also be appreciated that table movements are facilitated by use of ball screws and guide rails, powered by servo motors and encoder feedback It should further be appreciated that the working table 32 uses a micro computer system which allows a point to point or continuous path control.

The working table 32 moves the second pallets 91 from the shuttle assembly 30 into and out of contact with the buffing wheel 306 (FIG. 15) of the buffing mechanism 34 to buff the articles Once the buffing is completed, the working table 32 transfers the second pallets 91 to the unloading position or stations on the shuttle assembly 30.

Referring to FIG. 15, a plan view of the buffing mechanism 34 is shown. The buffing mechanism 34 includes a support frame, generally indicated at 290. The support frame 290 includes a pair of vertical columns 29 allow other portions of the support frame 290 to translate up and down along the columns 292. The support frame 290 also journally supports a rotatable primary shaft 294 between two end supports 296 and 298 of the support frame 290. The end support 298 is secured to the rest of the support frame 290 by means of fastener 299. The primary shaft 294 is generally cylindrical in shape and is also supported by a bearing 300 between a pair of support members 301 connected to the rest of the support frame 290. The bearing 300 and support members 301 support the primary shaft 294 in a cantilevered manner when end support 298 is removed or swung out of the way. The primary shaft 294 also has a plurality of pulleys 302 at one end. The primary shaft 294 also has an enlarged diameter area 303 along a section of its length to support a plurality of flexible buffing discs 304 which make up a buffing wheel, generally indicated at 306. A plurality of nozzles 308 are supported by laterally extending support members 310 connected to the rest of support frame 290. A source of abrasive material (not shown) and pressurized air are supplied through conduits 311 and 312 and are connected to the nozzles 308. The abrasive material and air mixture is discharged from the nozzles 308 to cooperate with the buffing wheel 306 to buff or polish the articles.

A secondary shaft 314 is also supported by the support frame 290 and spaced from the primary shaft 294. The secondary shaft 314 also includes a plurality of pulleys 316 at one end and in alignment with the first pulleys 302 of the primary shaft 294. A plurality of "V" shaped belts 318 interconnect the first 302 and second 316 pulleys. The secondary shaft 314 also includes a plurality of third pulleys 320 at its other end. A variable speed drive motor 322 having a rotating shaft 324 is also supported by the support frame 290 and spaced longitudinally from the secondary shaft 314. A plurality of fourth pulleys 326 are connected to one end of the shaft 324 of the drive motor 322 and are in alignment with the third pulleys 320 of the secondary shaft 314. A plurality of "V" shaped belts 328 interconnect the third 320 and fourth 326 pulleys. The drive motor 322 is connected to and controlled by the main electrical control panel 46.

In operation, electrical power to the drive motor 322 rotates its shaft 324 and the fourth pulleys 326. As the fourth pulleys 326 rotate, the belts 328 rotate, in turn, rotating the third pulleys 320, secondary shaft 314 and second pulleys 316. As the second pulleys 316 rotate, the first belts 318 rotate, in turn, rotating the first pulley 302, primary shaft 294 and buffing wheel 306. It should be appreciated that any type of drive train or mechanism can be used to rotate the primary shaft 294 and buffing wheel 306. It should also be appreciated that the air and abrasive mixture can be controlled by the main electrical control panel 46 to the discharged at predetermined times.

Referring to FIGS. 16 through 18, a quick change assembly, generally indicated at 330, of the present invention for removing the buffing discs or wheel 306 is shown. A first plate member 332 is disposed about the primary shaft 294 near one end of the enlarged diameter portion 303. A moveable second plate 334 is disposed laterally from the first plate 332 about the enlarged diameter portion 303 of the primary shaft 294. The buffing discs 304 are disposed adjacent one another and are supported on the enlarged diameter portion 303 of the primary shaft 294 between the first 332 and second 334 plates.

Referring to FIGS. 16 and 18, a plurality, and preferably three, cylinder assemblies, generally indicated at 336, are connected to the primary shaft 294. The cylinder assemblies 336 each comprise a cylinder 338 having a piston (not shown) disposed therein for axial movement. A piston rod 340 has a first end connected to the piston and a second end extending axially outwardly from the cylinder 338 and connected to the second plate 334. The cylinder assemblies 336 include bracket members 342 disposed about the cylinders 338 and secured by means such as fasteners 344 to the primary shaft 294.

The cylinder assemblies 336 are equally spaced circumferentially about the primary shaft 294. A rotary coupling 347 is disposed at the end of the primary shaft 294. The cylinder assemblies 336, preferably, have a source of pressurized air connected to them by conduits (not shown) which extend through a passageway 346 in the primary shaft 294 and are connected to the rotary coupling 347. It should be appreciated that hydraulic fluid could be used to actuate the cylinder assemblies 336. The cylinder assemblies 336 rotate with the primary shaft 294 and are actuated such as to extend or retract the second plate 334 axially along the primary shaft 294. A flexible housing 348 is disposed about the cylinder assemblies 336 to prevent foreign matter from contacting them.

Referring to FIG. 17, the first plate 332 is generally circular and includes a generally circular aperture 350 communicating axially therethrough. The first plate 332 includes a plurality of generally rectangular pockets 352 extending radially outwardly from the circular aperture 350 formed in the first plate 332. Preferably, six pockets 352 are formed in the first plate 332 and spaced substantially equally circumferentially about the aperture 350 of the first plate 332. Preferably, only three of the pockets 352 communicate through the first plate 332 The other three pockets 352a are recessed in the first plate 332 and have a flange Portion 353 between the sides of the pockets 352a. The enlarged section 302 of the primary shaft includes a plurality of circumferentially spaced keeper members 354. Preferably, three keys or keeper members 354 are spaced substantially equally circumferentially about and secured to the primary shaft 294 by means such as welds 356 The sloping portions 358 of the keeper members 354 are generally rectangular and have an inclined or sloping portion 358 at one end which acts as a guide. The keeper members 354 cooperate with the pockets 352 of the first plate 332 to guide the first plate 332 onto the primary shaft 294. Once the first plate 332 is moved to a slot 360 in the keeper members 354, the first plate 332 is rotated such that the flange portions 353 between the pockets 352a are about the ends of the keeper members 354.

To remove the buffing wheel 306, pressurized air or hydraulic fluid to the cylinder assemblies 336 is discontinued. As a result, the compressed buffing discs 304 expand to move the second plate 334 away from the first plate 332. The end support 298 of the support frame 290 is swung out of the way by unsecuring fastener 299 to disengage the end of the primary shaft 294. The first plate 332 is then pushed toward the buffing wheel 306 and rotated such that the pockets 352 become aligned with the keeper members 354. The first plate 332 is moved axially to disengage the first plate 332 from the primary shaft 294. Each of the discs 304 of the buffing wheel 306 are then slid axially off the primary shaft 294.

Once the buffing wheel 306 has been replaced, the pockets 352 of the first plate 332 are aligned with the keeper members 354 and the first plate 332 is moved axially onto the primary shaft 294 to the slot 360 past the ends of the keeper members 354. The first plate 332 is then manually rotated to align the flange portions 353 with the ends of the keeper members 354. Once this is accomplished, pressurized air is provided to the cylinder assemblies 336, thereby causing the piston rod 340 to rapidly move the second plate 334. The second plate 334 compresses the buffing discs 304 toward the first plate 332 to secure them therebetween.

Referring to FIG. 1, once the second pallets 91 are unloaded by the working table 32 on the unloading stations of the shuttle assembly 30, the pallet presence sensors 258 send a signal to the main electrical control panel 46. The main electrical control panel 46 sends a signal to actuate the cylinders to lower the keeper bar 248. The clamp assemblies 266 are actuated by the main electrical control panel to engage the flanges 119 on the base member 110 of the second pallets 91. The main electrical control panel 46 sends a signal to the drive cylinder 220 to retract the piston rod 226, drive bar 232 and second pallets 91. Upon the second pallets 91 arriving at the retracted position, a signal from a limit switch (not shown) is sent to panel 46 which relays a signal to actuate the cylinders to raise the keeper bar 248. Once this is accomplished, another limit switch (not shown) signals the panel 46 which relays a signal for the clamp assemblies 266 to disengage the flanges 119 on the base member 110 of the second pallets 91, allowing the second pallets 91 with finished articles to be conveyed to the unloading station 36.

At the unloading station 36, a second escapement mechanism 170, previously described, is located along the conveyor 28. A pallet presence sensor 172 will send a signal to the panel 46 which a relays a signal to unclamp the second pallet 91. The unclamp/locating device 186 will engage the second pallet 91 and unclamp the ketch member 140 from the article. Preferably, the operator will manually remove the article from the second pallet 91. The operator will release a foot pedal 370 signaling the unclamp/locating device 186 to retract or disengage the second pallet 91. Once this occurs, the panel 46 will actuate the second escapement mechanism 170, releasing the second pallet 91 and allowing it to be conveyed to the second escapement mechanism 170 across from the first robot 20 After a predetermined time delay, the second escapement mechanism 170 will cycle, allowing a second pallet 91 to enter the unloading station 36. It should be appreciated that the unloading station 36 could be fully automated for unloading the articles from the second pallets 91.

IN OPERATION

Referring to FIG. 1, the articles are loaded by a robot 49 or the like at the loading station 14. A first pallet 50 traveling along the first conveyor 12 is stopped by the first escapement mechanism 60. At the first escapement mechanism 60, two switches or sensors, a fixture or pallet presence switch or sensor 62 and a part or article present switch or sensor 63 sense whether a first pallet 50 is present and if there is an article on the first pallet 50. If there is no article on the first pallet 50, the first pallet 50 is held by the pallet stopping device 64 and a signal is given by the main electrical control panel 46 to the pallet locating device 64b to engage the first pallet 50. After the first pallet 50 is engaged and the pallet engaged switch (not shown) is triggered, a signal is given by the main electrical control panel 46 to the robot 49 to load an article onto the first pallet 50. Once the article is loaded on the first pallet 50 and the robot 49 signals that its arm is clear of the first escapement mechanism 60, a signal is given by the main electrical control panel 46 to retract or disengage the pallet locating device 64b. Another signal is then given by the main electrical control panel 46 to the first escapement mechanism 60 to retract the first pallet stopping device 64 to release the first pallet 50 and extend the second pallet stopping device 64a to stop another first pallet 50. After a predetermined time delay. a signal is given to the first escapement mechanism 60 to extend the first pallet stopping device 64 and retract the second pallet stopping device 64 and retract the second pallet stopping device 64a to load another first pallet 50 onto the loading station 14. If a plurality of first pallets 50 back up on the first conveyor 12 to trigger the second pallet presence sensor 88 the first escapement mechanism 60 at the loading station will not release any first pallets 50 until the second pallet presence sensor 88 is clear.

The first pallets 50 travel along the first conveyor 12 to the cleaning or air blow-off station 16. The first pallet 50 will trigger a limit switch 89 which turns on pressurized air from an air source which flows through the nozzles in the housing. The pressurized air will blow-off any moisture or foreign articles passing through the housing. If the limit switch 89 is not triggered again by another first pallet 50, a time delay will turn off the pressurized air.

The first pallet 50 with the article on it is conveyed from the air blow-off station 16 to the first robot pickup station 90 of the grinding station 18. A first escapement mechanism 60 at the first robot pickup station 90 includes a pallet presence sensor 62 to sense whether a first pallet 50 is present and an article present sensor 63 to sense whether there is an article on the first pallet 50. If an article is present on the first pallet 50, a signal will be given to trigger the pallet locating device 64b to engage the first pallet 50. After the first pallet 50 is engaged and the pallet engaged limit switch (not shown) is triggered, the first robot 20 will pick up the article from the first pallet 50. Once the first robot 20 has picked up the part and it is confirmed by the article present switch on the end of the robot arm, the first robot 20 will present the article to the first belt grinder 24 and perform the grinding operation.

Once the first robot 20 signals that its arm is clear of the first escapement mechanism 60, a signal is given to return the pallet locating device 64b. Another signal is given to the first escapement mechanism 60 to release the first pallet 50. After a predetermined time delay, a signal is given to the first escapement mechanism 60 to load another first pallet 50 into the first robot pickup station 90 The first escapement mechanism 60 is configured to normally fire twice each cycle, thereby releasing one emptied first pallet 50 and one full first pallet 50 to be conveyed to the second robot pickup station 90a for pickup by the second robot 22. If the first pallets 50 backup for any reason on the first conveyor 12 and trigger the pallet presence sensor 92, the first escapement mechanism 60 at the first robot pickup station 90 will not release first pallets 50 until the sensor 92 is clear. It should be appreciated that if the pallet presence sensor 93 is not triggered, the first escapement mechanism 60 at the first robot pickup station 90 will cycle until this sensor 93 is triggered.

The second robot 22 at the second robot pickup station 90a will normally receive articles on every other first pallet 50. A first escapement mechanism 60 is located at the second robot pickup station 90a and operates similar to the first escapement mechanism 60 at the first robot pickup station 90. It should be appreciated that if no article is on the first pallet 50 at the second robot pickup station 90a, the stopping mechanism 60 will receive a signal to release the first pallet 50. Empty first pallets 50 from both the first 90 and second 90a robot pickup stations are conveyed back to the loading station 14. It should be appreciated that if the first robot 20 is not operating, the first escapement mechanism 60 at the first robot pickup station 90 will fire or cycle as long as the pallet presence sensor 92 is not triggered. It should also be appreciated that if the second robot 22 is not operating, first pallets 50 will back up to the pallet presence sensor 92, causing the first escapement mechanism 60 at the first robot pickup station 90 to start releasing first pallets 50 regardless if the first pallet 50 has an article on it. It should be further appreciated that the first escapement mechanism 60 at the first robot pickup station 90 will only release empty first pallets 50 when the pallet presence sensor 92 is not triggered.

Once the articles have been completed at the grinding station 18, the robots 20 and 22 will load them onto empty locking or second pallets on the second conveyor 28. A second escapement mechanism 170 is located along the second conveyor 28 across from the first robot 20. The second escapement mechanism 170 includes a pallet presence sensor 171, an article present sensor 172 and a pallet unclamp/locating device 186. The pallet presence sensor 171 senses whether a second pallet 91 is present and an article present sensor 172 senses whether there is an article on the second pallet 91. If a second pallet 91 is present with an article on it, a signal to the second escapement mechanism 170 will release the second pallet 91. After a predetermined time delay, a signal is given by the main electrical control panel 46 to second escapement mechanism 170 to load another second pallet 91 into the second escapement mechanism 170 across from the first robot 20.

If a second pallet 91 is present with no article on it, a signal will be given by panel 46 to the pallet unclamp/locating device 186 to engage the second pallet 91. After the pallet unclamp/locating device 186 has engaged the second pallet 91 and a limit switch (not shown) triggered, the first robot 20 will receive a signal to load an article onto the second pallet 91. Once the first robot 20 has loaded an article onto the second pallet 91 and the first robot 20 signals that its arm is clear, it is confirmed by the pallet presence sensor. A signal is given by the main electrical control panel 46 to return the pallet locating/unclamp device 186. Another signal is given by the main electrical control panel 46 to the second escapement mechanism 170 across from the first robot 20 to release the second pallet 91. After a predetermined time delay a signal is given by the main electrical control panel 46 to the second escapement mechanism 170 to load another second pallet 91 into the second escapement mechanism 170 across from the first robot 20 It should be appreciated that in order for the second robot 22 not to be starved for articles, if the pallet presence sensors and article present sensors are triggered, the pallet unclamp/locating device 186 will not function and the second escapement mechanism 170 across from the first robot 20 will release a second pallet 91. It should also be appreciated that the second escapement mechanism 170 across from the first robot 20 is configured to normally fire twice each cycle, thereby releasing one full second pallet 91 and one empty second pallet 91 each full cycle.

Another second escapement mechanism 170 is located along the second conveyor 28 across from the second robot 22. Second pallets 91 with articles and empty pallets from the second escapement mechanism 170 across from the first robot 20 are conveyed to the second escapement mechanism 170 across from the second robot 22. The operation is similar to that across from the first robot 20, except that second pallets 91 having articles on them loaded by the first robot 20 will be passed through on the second conveyor 28 to the second robot 22. It should be appreciated that if the first robot 20 is not operating, the second escapement mechanism 170 across from the second robot 22 will only release empty second pallets 91 when the pallet presence sensor 198 is not triggered. It should also be appreciated that if the second robot 22 is not operating, second pallets 91 will back up to trigger the pallet presence sensor 198 preventing the second escapement mechanism 170 across from the second robot 22 from releasing second pallets 91. When this occurs, the pallet presence sensor 198 will turn ON a warning light at the operator electrical control panel 47, signaling a shutdown. If the operator wishes to continue the operation, it must activate a manual override switch (not shown) on the operator electrical control panel 47 that will allow the second escapement mechanism 170 across from the second robot 22 to pass a second pallet 91 through to another second escapement mechanism 170a. The second escapement mechanism 170 across from the second robot 22 at the second load station will only release a second pallet 91 if pallet presence switch 198 is triggered. The second escapement mechanism 170 across from the first robot 20 will only release a second pallet 91 if article present sensor 172 is triggered and pallet presence sensor 171 is cleared.

Loaded second pallets 91 are conveyed to the second escapement mechanism 170a which controls the feed to the shuttle assembly 30. The second escapement mechanism 170a operates similar to the second escapement mechanism 170a across from the second robot 22 at the second load station. Second pallets 91 with articles loaded on them will be passed through the shuttle assembly 30. Second pallets 91 without an article will trigger a light at the operator electrical control panel 47 to indicate that a second pallet 91 is without an article and shut down the second escapement mechanism 170a. The operator must purge the shuttle assembly 30 by activating an override switch on the operator electrical control panel 47 by disengaging the third pallet stopping devices 200 with the second pallets 91 to allow them to travel along the second conveyor 28 and reset the second escapement mechanism 170a as to be described.

Along the shuttle assembly 30, five (loading and unloading) stations are located with a third pallet stopping devices 200 and a pallet presence switch 252. To begin the sequence of the shuttle assembly 30, the pallet presence sensor 252 adjacent third pallet stopping device 200a must be clear for a predetermined time period to ensure adequate time for all second pallets 91 to leave the loading area or have counted five second pallets 91 passing through this station. The third pallet stopping device 200a will extend triggering the limit switch (not shown) which sends a signal to the main electrical control panel 46. The panel 46 relays a signal to the second escapement mechanism 170a to fire allowing one (1) second pallet 91 to be conveyed to the third pallet stopping device 200a. When a second pallet 91 stops against third pallet stopping device 200a, the pallet presence switch 252a will detect or sense the second pallet 91, signaling the third pallet stopping device 200b to extend. The third pallet stopping device 200b will extend, triggering its limit switch and signaling the second escapement mechanism 170a to fire, allowing one (1) second pallet 91 to be conveyed to the third pallet stopping device 200b. It should be appreciated that the same process occurs until all five stations have a second pallet 91 resting against its corresponding third pallet stopping device 200.

When the second pallet 91 stops against the third pallet stopping device 200e, the pallet presence switch 252e will detect the second pallet 91 and the main electrical control panel 46 will instruct the keeper bar 248 to drop, triggering its limit switch (not shown), and signaling the drive cylinder 220 to be actuated. The drive cylinder 220 moves its piston rod 226 and drive bar 232 to engage the second pallets 91 pushing them forward into the pickup or load station for the working table 32. When the second pallets 91 are in the loading station, a limit switch (not shown) is triggered, signaling the third pallet stopping devices 200a through 200e to retract.

The working table 32, upon completing its cycle, will check the status of the terminal clear switches 258 to make sure that the unloading stations are clear, and then move the finished articles to the unloading station. A working table 32 then unclamps the second pallets 91 sending a signal to the panel 46 which relays the signal to the working table to back out of the unloading stations and move to the loading terminals At the loading stations, the working table 32 clamps the second pallets 91. The working table 32 then backs out of the loading station and starts its buffing sequence with the buffing device 34. The panel 46 sends the signal to the clamping assemblies 266 to engage the second pallets. The drive cylinder then retracts pulling the articles and second pallets 91 back onto the second conveyor 28. Upon the second pallets 91 arriving at the retracted position, a signal from a limit switch (not shown) is sent to main electrical control panel 46 which relays the signal to actuate the cylinders to raise the keeper bar 248. Once this is accomplished, another limit switch (not shown) signals the main electrical control panel 46 which relays the signal for the clamp assemblies 266 to disengage the flanges 119 of the base member 110 of the second pallets 91, allowing the second pallets 91 with finished articles to be conveyed to the unloading station 36.

When a second pallet 91 is present at the second escapement mechanism 170 at the loading station, the pallet presence switch 171 will be triggered. The main electrical control panel 46 will send a signal to the unclamp/locating device 186 to disengage and unclamp the ketch member 140 from the article. The operator will manually remove the part and release the foot pedal 370, signaling the unclamp/locating device 186 to retract. The second stopping device 170 at the loading station will release the second pallet 91 allowing it to be conveyed back to the second escapement mechanism 170 across from the first robot 20, and permitting a second pallet 91 to be loaded with a new article.

Figure 21:
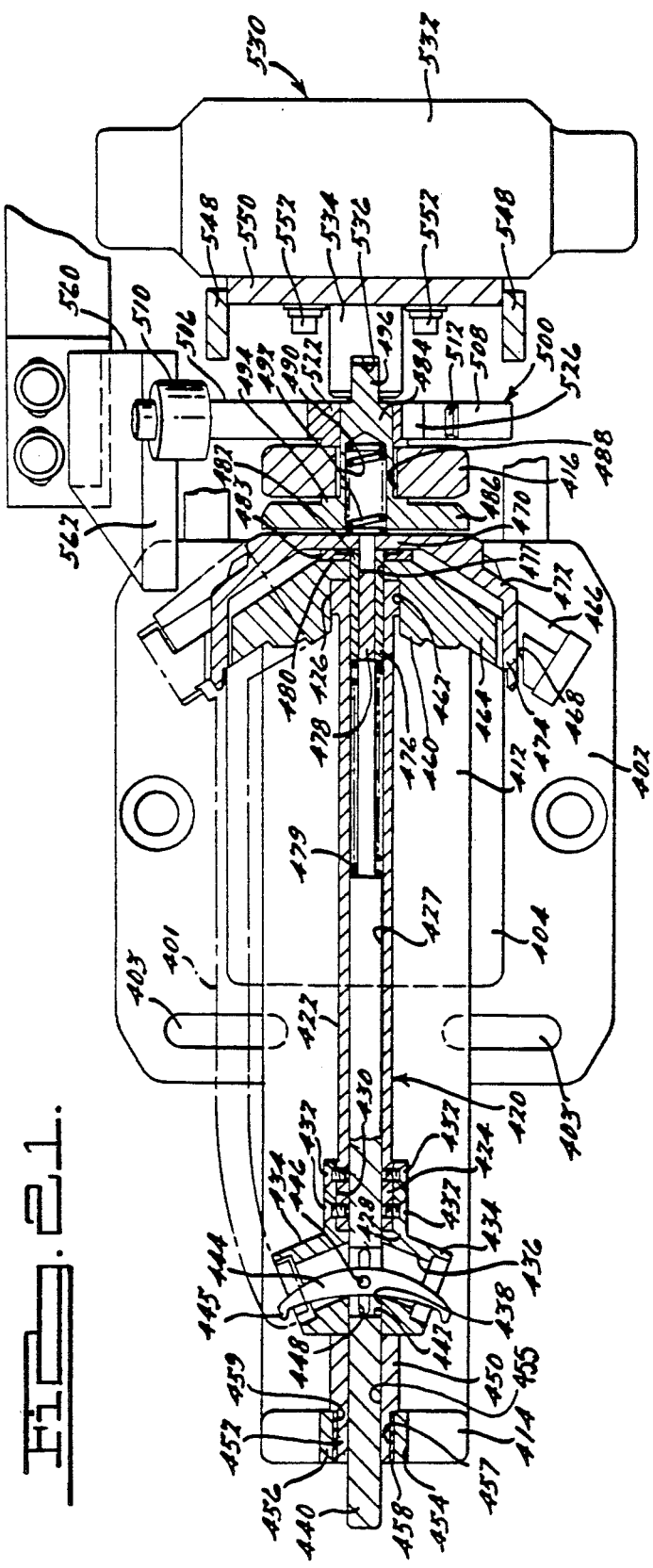
FIG. 21 is a plan view partially broken away of the rotatable pallet of FIGS. 19 and 20.
Figure 22:
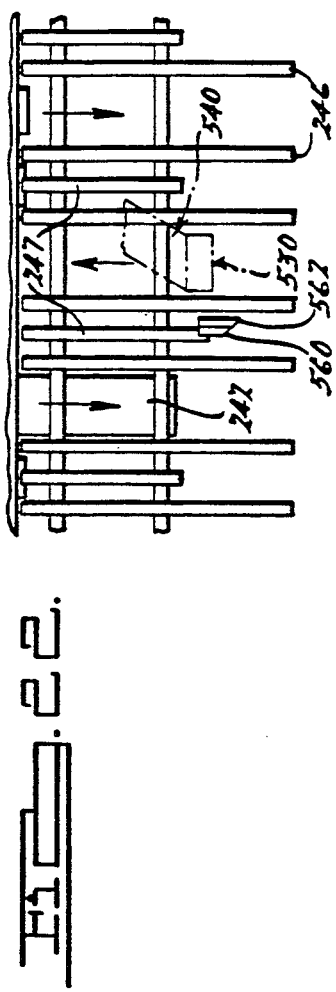
FIG. 22 is a partial plan view of a second embodiment of the shuttle assembly of FIG. 13 for cooperating with the rotatable pallet of FIGS. 19 through 21.

Referring to FIGS. 19 through 21, a rotatable pallet 400, according to the present invention, is shown for cooperating with the shuttle assembly 30, moveable working table 32 and buffing device 34. The rotatable pallet 400 supports a symmetrically shaped article 401 such as a plumbing or faucet spout and allows the article 401 to be automatically rotated or turned a predetermined amount such as one hundred twenty degrees (120°) to be finished completely. It should be appreciated that the article 401 may be rotated, for example one hundred eighty degrees (180°), such that it may be finished on an upper and lower side thereof as held by the pallet 400.

The rotatable pallet 400 includes a base member 402 which engages chains 94 and 95 and moves along the track 100 of the second conveyor 28 The base member 402 is generally rectangular and planar in shape. The base member 402 includes a pair of spaced upright flanges 403 along one side and adapted to be engaged and disengaged by the clamp assembly 266 The rotatable pallet 400 also includes a base 404 having a pair of longitudinally spaced upright or vertical support members 406 and 408 connected at one end to the base 404. The support members 406 and 408 are generally rectangular in shape and extend transversely The base 404 is connected to the base member 402 by suitable means such as fasteners 410

The rotatable pallet 400 further includes an upper plate member 412 connected at the other end of the support members 406 and 408. The upper plate member 412 is generally rectangular in shape. The upper plate member 412 extends longitudinally beyond support members 406 and 408 and has an end plate members 414 and 416 connected at each end to the upper plate member 412 by suitable means such as fasteners (not shown). The end plate members 414 and 416 are generally rectangular in shape and extend transversely and upwardly. The upper plate member 412 and end plate members 414 and 416 form a generally "U" shaped configuration as illustrated in FIG. 19 The rotatable pallet 400 may include one or more rib members 418 extending between the end plate member 414 and upper plate member 412 to add strength therebetween. It should be appreciated that rib members may extend between end plate member 416 and upper plate member 412. It should also be appreciated that the base 404, support members 406 and 408, upper plate member 412, end plate members 414 and 416 and rib member 418 may be separate members or integral.

The rotatable pallet 400 also includes a fixture assembly, generally indicated at 420, extending longitudinally between the end plate members 414 and 416. The fixture assembly 420 includes an outer sleeve 422 having first and second ends 424 and 426, respectively. The outer sleeve 422 is generally an elongated tubular member having a passageway 427 extending longitudinally therethrough. Preferably, the outer sleeve 422 has a circular cross-section. The fixture assembly 420 also includes a first fixture member 428 having a cavity 430 formed therein at one end. The first end 424 of the outer sleeve 422 is disposed in the cavity 430 and secured to the first fixture member 428 by suitable means such as fasteners 432. The first fixture member 428 has a pair of platform portions 434 extending outwardly radially and longitudinally toward the end plate member 414. The platform portions 434 have an aperture 436 extending along an elongated axis thereof to communicate with a passage 438 extending centrally and longitudinally through the first fixture member 428 and communicating with the cavity 430. A portion of the article 401 is disposed within the aperture 436.

The fixture assembly 420 also includes a shaft 440 extending longitudinally through the passage 438 of the first fixture member 428 and into the passageway 427 of the outer sleeve 422. The shaft 440 is generally circular in cross-section and includes an aperture 442 extending transversely therethrough. The fixture assembly 420 further includes a first securement member 444 extending through the aperture 442 and apertures 436 of the platform portions 434. The first securement member 444 is generally arcuately shaped and has a projection 445 extending longitudinally toward end plate member 414. The projection 445 is adapted to engage and disengage the article 401. The first securement member 444 is secured to the shaft 440 by suitable means such as a fastener 446 extending through an elongated longitudinal slot 448 of the shaft 440. The elongated slot 448 allows longitudinal adjustment of the first securement member 444 within the apertures 436 of the platform portions 434 such that the projections 445 engage the article 401 and secure the article to the first fixture member 428. It should be appreciated that the fixture assembly 420 may have various configurations for supporting the articles 401 and securing the articles 401 to the pallet 400.

The fixture assembly 420 also includes a sleeve member 450 disposed about the shaft 440 between the first fixture member 428 and the end plate member 414 The sleeve member 450 has a reduced diameter portion 452 extending through an aperture 454 in the end plate member 414. The sleeve member 450 has a generally circular cross-section and includes an aperture 455 extending longitudinally therethrough. The shaft 440 extends longitudinally through the aperture 455 in the sleeve member 450 and beyond the end plate member 414. The fixture assembly 420 includes a bushing 456 disposed in the aperture 454 of the end plate member 414 and has a bearing sleeve 458 disposed within an aperture 457 thereof. The bushing 456 and bearing sleeve 458 are tubular members having a generally circular cross-section. The reduced portion 452 of the bushing sleeve 450 is disposed within an aperture 459 of the bearing sleeve 458. The bearing sleeve 458 reduces friction between the bushing 456 and sleeve member 450 when the shaft 440 and sleeve member 450 are rotated.

The fixture assembly 420 also includes a second fixture member 460 having a cavity 462 formed therein at one end. The second end 426 of the outer sleeve 427 is disposed in the cavity 462. The second fixture member 460 has a pair of platform portions 462 extending outwardly radially and longitudinally toward the endplate member 414. The platform portions 462 are generally cylindrical in shape. The platform portions 462 include a recess portion 466 extending along one side thereof near the end plate member 416 and an aperture 468 extending longitudinally therethrough near the free end thereof. A portion of the article 401 is disposed about the platform portion 462.

The fixture assembly 420 further includes a second securement member 470 spaced longitudinally from the second fixture member 460. The second securement member 470 is spaced between the second fixture member 460 and end plate member 416 and extends radially outwardly. The second securement member 470 includes a pair of arms 472 extending outwardly radially and longitudinally along the recess portion 466 of the platform portions 464. The arms 472 each have a flange 474 extending longitudinally through the apertures 468 of the platform portions 464 and toward the end plate member 414. Rotation of the second securement member 470 causes the second fixture member 460 to rotate, in turn, rotating the outer sleeve 422 and first fixture member 434.

The second securement member 470 has an inner sleeve 476 extending longitudinally through an aperture 477 in the second fixture member 460 and into the passageway 427 of the outer sleeve 422 The inner sleeve 476 is an elongated tubular member and may include a pin member 478 disposed therein. The fixture assembly 420 includes a spring member 479 disposed within the passageway 427 of the outer sleeve 422 between the end of the inner sleeve 476 and shaft 440 to urge the second securement member 470 away from the second fixture member 460. The second securement member 470 is adapted to engage and disengage the article 401.

The fixture assembly 420 also includes a stop member 480 having an aperture 482. The stop member 480 extends radially and has an annular projection 483 extending longitudinally toward the end plate member 416. The inner sleeve 476 extends through the aperture 482 of the stop member 480. The stop member 482 is disposed between the second fixture member 460 and second securement member 470 to limit longitudinal movement of the second securement member 470 relative to the second fixture member 460

The rotatable pallet 400 further includes a rotatable actuating member 484 for allowing the fixture assembly 420 to be rotated. The actuating member 484 has an end portion 486 extending radially outwardly and disposed between the end plate member 416 and second securement member 470. The end portion 486 is secured to the second securement member 470 by suitable means such as fasteners (not shown). The actuating member 484 is generally cylindrical and extends longitudinally through an aperture 488 in the end plate member 416 and beyond thereof. The aperture 488 may include a bearing sleeve (not shown). The actuating member 484 has a cavity 490 extending longitudinally from the end portion 486 and into the actuating member 484. The actuating member 484 includes a spring member 492 disposed within the cavity 490 between the actuating member 484 and the second securement member 470 to urge the actuating member 484 away from the second securement member 470. The actuating member 484 includes a shoulder 494 to limit movement of the actuating member 484 toward the end plate member 416. The actuating member 484 has a head portion 496 at the end thereof. The head portion 496 is generally rectangular in shape and adapted to be engaged to rotate the actuating member 484. It should be appreciated that rotation of actuating member 484 causes rotation of the second securement member 470

The rotatable pallet 400 also includes a unique locking arrangement, generally indicated at 500, to rotatably secure the fixture assembly 420 relative to the end plate members 414 and 416. The locking arrangement 500 includes a lever arm 502 pivotally supported by a fastener 504 secured to the end plate member 416. The lever arm 502 extends transversely to a longitudinal axis of the rotatable pallet 400 to form a generally horizontal lower portion 506 and a generally vertical upper portion 508. The lower portion 506 has a cylindrical roller 510 near its free end. The upper portion 508 has a finger 512 extending transversely near its free end.

The locking arrangement 500 also includes a spring member 514 having one end secured by a fastener 516 to the lower portion 506 of the lever arm 502 and its other end secured by a fastener 518 to an extension 520 of the end plate member 416. The spring member 514 urges the lower portion 506 toward the base member 402. It should be appreciated that the extension 520 may be secured to the end plate member 416 by suitable means such as fasteners (not shown) or integral therewith.

The locking arrangement 520 further includes a locking member 522 having an aperture 524 extending longitudinally therethrough. The locking member 522 is generally cylindrical in shape and has a pair of oppositely disposed locking slots 526. The locking slots 526 are generally rectangular in shape and adapted to receive the finger 512 of the lever arm 502. The locking member 522 has a shoulder 526 which abuts the end plate member 416. The actuating member 484 extends through the aperture 524 such that the locking member 522 is secured to the actuating member 484. It should be appreciated that the locking member 522 rotates with the actuating member 484.

Referring to FIGS. 19 through 22, a second embodiment of the shuttle assembly 30 is shown. Like parts have like numerals. The second embodiment of the shuttle assembly 30 includes a rotating mechanism, generally indicated at 530, to rotate the actuating member 484 and fixture assembly 420. The rotating assembly 530 includes a motor 532 having a rotatable shaft 534. The shaft 534 has a recess 536 at its free end The recess 536 is generally rectangular in shape and adapted to receive the head portion 496 of the actuating member 484. It should be appreciated that the motor 532 may be of a suitable type to rotate the fixture assembly 420 such as air-operated, electrical, etc. In the preferred embodiment, the motor 532 is air-operated such as an air rotator and connected to a source of pressurized air.

The second embodiment of the shuttle assembly 30 also includes a support structure, generally indicated at 540, for supporting the rotating mechanism 530 above the skid rails 246 and 247 thereof. The support structure 540 includes a support member 542 secured to the secondary support frame 210 of the shuttle assembly 30. The support structure 540 includes a plate member 544 secured by suitable means such as a fastener 546 to the support member 542. The plate member 544 is generally rectangular in shape. A side member 548 extends downwardly from each end of the plate member 544. The side member 548 has a generally triangular shape and is secured to the support member 542 by suitable means such as welding. A backing plate 550 extends downwardly from one end of the side members 548. The backing plate 550 is generally rectangular in shape and is secured to the side members 548 by suitable means such as welding. The motor 532 is secured to the lower end of the backing plate 550 by suitable means such as fasteners 552.

The second embodiment of the shuttle assembly 30 also includes a ramp member 560 extending upwardly from the skid rail 247 in the rotatable position. The ramp member 560 includes a ramp or inclined portion 562. The roller 510 of the lever arm 502 is adapted to travel along the ramp portion 562 when the rotatable pallet 400 is in the rotatable position.

In operation, a symmetrically shaped part or article 401 is loaded upon the rotatable pallet 400. As shown in FIG. 21, the article 401 such as a faucet spout shown in phantom lines has one end disposed about the platform portion 464 of the second fixture member 460 and another portion extending into the apertures 436 of the first fixture member 434. The first securement member 444 engages the article 401 to secure the article 401 to the first fixture member 434 and the arms 472 engage the article 401 to secure the article 401 to the second fixture member 460. The rotatable pallet 400 moves along the track 100 of the second conveyor 28 to the second embodiment of the shuttle assembly 30 Once the shuttle assembly 30 is loaded with a predetermined number of rotatable pallets 400, the drive cylinder 220 moves its piston rod 226 and drive bar 232 to engage the rotatable pallets 400 pushing them forward into the pickup or load station for the working table 32.

The working table 32 moves the rotatable pallets 400 from the shuttle assembly 30 into contact with the buffing wheel 306 (FIG. 15) of the buffing mechanism 34 to buff a portion or one side of the articles 401. Once the buffing is completed, the working table 32 rotates the rotatable pallets 400 such that the roller 510 will engage the ramp portion 562 and transfers the rotatable pallets 400 to the rotatable position or stations on the second embodiment of the shuttle assembly 30. When this occurs, the roller 510 on the lever arm 502 engages the ramp portion 562 of the ramp member 560 and travels upwardly thereon to rotate the lever arm 502 and disengage the finger 512 with the locking slot 526 of the locking member 522. The head portion 496 of the actuating member 484 is then disposed in the recess 536 of the shaft 534 for the rotating mechanism 530. The motor 532 rotates the shaft 534 preferably one hundred twenty degrees (120°), in turn, rotating the actuating member 484 and fixture assembly 420 one hundred twenty degrees (120°). Once this has occurred, a limit switch (not shown) is triggered and the working table 32 moves the rotatable pallet 400 from the rotatable position of the second embodiment of the shuttle assembly 30 The roller 510 then travels down the ramp portion 562. The spring member 514 pulls on the lower portion 6 of the lever arm 502 thereby rotating the upper portion 508 such that the finger 512 engages the other locking slot 526 of the locking member 522. The working table 32 then moves the rotatable pallets 400 into contact with the buffing wheel 306 of the buffing mechanism 34 to buff the other side or former lower side of the articles 401. Once the buffing is completed, the working table 32 rotates the rotatable pallets 400 such that the flanges 403 may be engaged by the clamp assembly 260 of the shuttle assembly 30 and transfers the rotatable pallets 400 to the unloading position or stations on the second embodiment of the shuttle assembly 30. The shuttle assembly 30 then transfers the rotatable pallets 400 to the second conveyor 28 as previously described.

The present invention has been described in an illustrative manner. It is to be understood that the terminology which has been used is intended to be in the nature of words of description rather than of limitation.

Many modifications or variations of the present invention are possible in light of the above teachings. Therefore, within the scope of the appended claims, the present invention may be practiced otherwise than as specifically described.

What is claimed is:

1. A pallet for supporting an article on a moving conveyor,
   a base member for resting upon the conveyor;
   a upper plate member spaced vertically from said base member; .
   at least one support member extending between said base member and said upper plate member;
   an end plate member extending upwardly from each end of said upper plate member;
   fixture means extending between said end plate members for supporting the article and adapted for rotation; and
   locking means for releasably securing said fixture means against rotation relative to said end plate member 2. The pallet as set forth in claim 1 including platform means forming a predetermined shape to support the article upon said fixture means.

3. The pallet as set forth in claim 2 wherein said locking means comprises a locking member operatively connected to said fixture means and a lever arm pivotally supported by one of said end plate members to engage and disengage said locking member.

4. The pallet as set forth in claim 3 wherein said locking member includes at least one locking slot.

5. The pallet as set forth in claim 4 including a finger at one end of said lever arm for engaging and disengaging said at least one locking slot when said lever arm is in a locking member engaged position and said locking member disengaged position.

6. The pallet as set forth in claim 5 including pivotal means for allowing said lever arm to pivot between said locking member engaged position and said locking member disengaged position 7. The pallet as set forth in claim 6 including spring means for urging said lever arm to said locking member engaged position.

8. The pallet as set forth in claim 7 including actuating member supported by one of said end plate members and rotatable to rotate said fixture means.

9. The pallet as set forth in claim 8 including a spring member for urging said actuating member away from said fixture means.

10. A pallet for supporting an article on a moving conveyor, comprising:

a base member for resting upon the conveyor;
a upper plate member spaced vertically from said base member;
at least one support member extending between said base member and said upper plate member;
an end plate member extending upwardly from each end of said upper plate member;
fixture means extending between said end plate members for supporting the article and adapted for rotation;
platform means forming a predetermined shape to support the article upon said fixture means;
a locking member operatively connected to said fixture means and a lever arm pivotally supported by one of said end plate members to engage and disengage said locking member for releasably securing said fixture means rotation relative to said end plate member.
said locking member includes at least one locking slot.,
a finger at one end of said lever arm for engaging and disengaging said at least one locking slot in a locking member engaged position and a locking member disengaged position;
pivotal means for allowing said lever arm to pivot between said locking member engaged position and said locking member disengaged position; and
spring means for urging said lever arm to said locking member engaged position.

* * * * *